United States Patent

Komaki

[11] Patent Number: 5,883,821
[45] Date of Patent: Mar. 16, 1999

[54] DATA TRANSFORMATION SYSTEM PERFORMING DATA TRANSFORMATION EMPLOYING INTERPOLATING OPERATION

[75] Inventor: Takeshi Komaki, Yokohama, Japan

[73] Assignee: Canon Kabushiki Kaisha, Tokyo, Japan

[21] Appl. No.: 689,179

[22] Filed: Jul. 30, 1996

[30] Foreign Application Priority Data

Jul. 31, 1995 [JP] Japan .................................. 7-195577

[51] Int. Cl.⁶ ................................ G06F 7/38; H04N 1/46
[52] U.S. Cl. ........................................... 364/723; 358/525
[58] Field of Search ................................ 364/723, 724.1; 358/428, 525

[56] References Cited

U.S. PATENT DOCUMENTS

| 4,275,413 | 6/1981 | Sakamoto et al. | 358/525 |
| 4,334,240 | 6/1982 | Franklin | 358/525 |
| 4,511,989 | 4/1985 | Sakamoto | 364/723 |
| 4,837,722 | 6/1989 | Sara | 364/723 |
| 5,241,373 | 8/1993 | Kanamori et al. | 348/645 |

Primary Examiner—Chuong Dinh Ngo
Attorney, Agent, or Firm—Fitzpatrick, Cella, Harper & Scinto

[57] ABSTRACT

A simplified arithmetic expression is used deed upon a divided segment in an interpolating solid body to be used for an interpolating operation, where an objective point for interpolation is located, for example on a grid point, on a line or on a plane, the number of times of making reference to a table or performing an arithmetic operation, such as addition, subtraction, multiplication and division is reduced to realize a high speed interpolating operation.

32 Claims, 39 Drawing Sheets

PERFORM INTERPOLATION BY DIVIDING INTERPOLATION GRID INTO SIX EQUAL SIZE QUADRANGULAR PYRAMID

| | |
|---|---|
| POSITION | u0 |
| | $dx=dy=dz=2^{n-1}$ |
| ARITHMETIC EXPRESSION | $v_{u0}$ |

DIVIDED SEGMENT 0

| POSITION | u1 |
| --- | --- |
| | dx=dy=dz=0 |
| ARITHMETIC EXPRESSION | $v_{u1}$ |

DIVIDED SEGMENT 1

| POSITION | ON STRAIGHT LINE u0-u1 (NOT INCLUDE ENDS) $dx=dy=dz, 0<dx<2^{n-1}$ |
|---|---|
| ARITHMETIC EXPRESSION | $\dfrac{dx \cdot v_{u0}+(2^{n-1}-dx)v_{u1}}{2^{n-1}}$ |

DIVIDED SEGMENT 2

| POSITION | ON STRAIGHT LINE u0-u2 (NOT INCLUDE ENDS) |
| --- | --- |
| | $dx = 2^n - dy = dz, \; 0 < dx < 2^{n-1}$ |
| ARITHMETIC EXPRESSION | $\dfrac{dx \cdot v_{u0} + (2^{n-1} - dx) v_{u2}}{2^{n-1}}$ |

DIVIDED SEGMENT 3

| POSITION | ON STRAIGHT LINE u0-u3 (NOT INCLUDE ENDS) $dx=dy=2^n-dz, 0<dx<2^{n-1}$ |
|---|---|
| ARITHMETIC EXPRESSION | $\dfrac{dx \cdot v_{u0} + (2^{n-1}-dx)v_{u3}}{2^{n-1}}$ |

DIVIDED SEGMENT 4

| POSITION | ON STRAIGHT LINE u0-u4 (NOT INCLUDE ENDS) $dx = 2^n - dy = 2^n - dz, 0 < dx < 2^{n-1}$ |
|---|---|
| ARITHMETIC EXPRESSION | $\dfrac{dx \cdot v_{u0} + (2^{n-1} - dx) v_{u4}}{2^{n-1}}$ |

DIVIDED SEGMENT 5

| POSITION | ON STRAIGHT LINE u1-u2 (NOT INCLUDE ENDS) $dx=dy=0, 0<dy<2^n$ |
|---|---|
| ARITHMETIC EXPRESSION | $\dfrac{(2^n-dy)v_{u1}+dy \cdot v_{u2}}{2^n}$ |

DIVIDED SEGMENT 6

| POSITION | ON STRAIGHT LINE u1–u3 (NOT INCLUDE ENDS) $dx=dy=0, 0<dz<2^n$ |
|---|---|
| ARITHMETIC EXPRESSION | $\dfrac{(2^n-dz)v_{u1}+dz \cdot v_{u3}}{2^n}$ |

DIVIDED SEGMENT 7

| POSITION | ON PLANE u0-u1-u2 (NOT INCLUDE BORDER) |
|---|---|
| ARITHMETIC EXPRESSION | $dx=dz,\ dx>0,\ dx-dy<0,\ dx+dy-2^n<0$ $$\frac{2dx \cdot v_{u0}+(2^n-dy-dx)\ v_{u1}+(dy-dx)v_{u2}}{2^n}$$ |

DIVIDED SEGMENT 8

| | |
|---|---|
| POSITION | ON PLANE u0–u1–u3 (NOT INCLUDE BORDER) |
| ARITHMETIC EXPRESSION | $dx=dy,\ dx>0,\ dx-dz<0,\ dx+dz-2^n<0$ $$\frac{2dx\cdot v_{u0}+(2^n-dz-dx)\,v_{u1}+(dz-dx)v_{u3}}{2^n}$$ |

DIVIDED SEGMENT 9

| POSITION | ON PLANE u0-u3-u4 (NOT INCLUDE BORDER) |
|---|---|
| ARITHMETIC EXPRESSION | $dx+dz-2^n=0,\ dx>0,\ dx-dy<0,\ dx+dy-2^n<0$ $$\frac{2dx\cdot v_{u0}+(2^n-dy-dx)\ v_{u3}+(dy-dx)v_{u4}}{2^n}$$ |

DIVIDED SEGMENT 10

| POSITION | ON PLANE u0−u2−u4 (NOT INCLUDE BORDER) |
|---|---|
| ARITHMETIC EXPRESSION | $dx+dy-2^n=0,\ dx>0,\ dx-dz<0,\ dx+dz-2^n<0$ $$\frac{2dx \cdot v_{u0}+(2^n-dz-dx)\,v_{u2}+(dz-dx)v_{u4}}{2^n}$$ |

DIVIDED SEGMENT 11

| POSITION | INSIDE OF QUADRANGULAR PYRAMID $u0-u1-u4-u3$ (NOT INCLUDE BORDER PLANE) $dx>0, dx-dy<0, dx+dy-2^n<0, dx-dz<0, dx+dz-2^n<0$ |
|---|---|
| ARITHMETIC EXPRESSION | $\dfrac{2dx \cdot v_{u0} + (2^n-dy-dx)(2^n-dz-dx)v_{u1} + (dy-dx)(2^n-dz-dx)v_{u2} + (2^n-dy-dx)(dz-dx)v_{u3} + (dy-dx)(dz-dx)v_{u4}}{2^n \cdot 2^{n}-2dx}$ |

DIVIDED SEGMENT 13

| POSITION | ON LINE u0-u5 (NOT INCLUDES BORDER) $dx=2^n-dy=2^n-dz, 2^{n-1}<dx<2^n$ |
|---|---|
| ARITHMETIC EXPRESSION | $\dfrac{dy \cdot v_{u0}+(2^{n-1}-dy)v_{u5}}{2^{n-1}}$ |

DIVIDED SEGMENT 14

| POSITION | ON LINE u0-u7 (NOT INCLUDES BORDER) $dx = 2^n - dy = dz, 2^{n-1} < dx < 2^n$ |
|---|---|
| ARITHMETIC EXPRESSION | $\dfrac{dy \cdot v_{u0} + (2^{n-1} - dy) v_{u7}}{2^{n-1}}$ |

DIVIDED SEGMENT 15

| POSITION | ON LINE u1-u5 (NOT INCLUDES BORDER) $dy=dz=0, 0<dx<2^n$ |
|---|---|
| ARITHMETIC EXPRESSION | $\dfrac{(2^n-dx)v_{u1}+dx \cdot v_{u5}}{2^n}$ |

DIVIDED SEGMENT 16

| POSITION | ON PLANE u0-u1-u5 (NOT INCLUDE BORDER) |
|---|---|
| ARITHMETIC EXPRESSION | $dy-dz=0,\ dy>0,\ dx-dy>0,\ dx+dy-2^n<0$ $$\frac{2dy \cdot v_{u0}+(2^n-dx-dy)\ v_{u1}+(dx-dy)v_{u5}}{2^n}$$ |

DIVIDED SEGMENT 17

| POSITION | ON PLANE u0-u3-u7 (NOT INCLUDE BORDER) |
|---|---|
| ARITHMETIC EXPRESSION | $dy+dz-2^n=0$, $dy>0$, $dx-dy>0$, $dx+dy-2^n<0$ $$\frac{2dy \cdot v_{u0}+(2^n-dx-dy)\ v_{u3}+(dx-dy)v_{u7}}{2^n}$$ |

DIVIDED SEGMENT 18

| POSITION | ON PLANE u0-u5-u7 (NOT INCLUDE BORDER) |
|---|---|
| ARITHMETIC EXPRESSION | $dx+dy-2^n=0,\ dy>0,\ dy-dz>0,\ dy+dz-2^n<0$ $$\frac{2dy \cdot v_{u0}+(2^n-dz-dy)v_{u5}+(dz-dy)v_{u7}}{2^n}$$ |

DIVIDED SEGMENT 19

| POSITION | ON PLANE u1-u3-u7-u5 (NOT INCLUDE BORDER) |
|---|---|
| ARITHMETIC EXPRESSION | $\dfrac{dy=0,\ 0<dx<2^n,\ 0<dz<2^n}{}$ $\dfrac{(2^n-dx)(2^n-dz)v_{u1}+(2^n-dx)\,dz\cdot v_{u3}+dx(2^n-dz)\,v_{u5}+dx\cdot dz\cdot v_{u7}}{2^{2n}}$ |

DIVIDED SEGMENT 20

POSITION: INSIDE OF QUADRANGULAR PYRAMID u0-u1-u3-u7-u5 (NOT INCLUDE BORDER PLANE)

$dy>0, dx-dy>0, dx+dy-2^n<0, dy-dz<0, dy+dz-2^n<0$

ARITHMETIC EXPRESSION:

$$2dy \cdot v_{u0} + \frac{(2^n-dx-dy)(2^n-dz-dy)v_{u1} + (2^n-dx-dy)(dz-dy)v_{u3} + (dx-dy)(2^n-dz-dy)v_{u5} + (dx-dy)(dz-dy)v_{u7}}{2^n - 2dy}$$

$$2^n$$

DIVIDED SEGMENT 21

| POSITION | ON LINE u0-u6 (NOT INCLUDE BORDER) $dx=dy=2^n-dz, 2^{n-1}<dx<2^n$ |
|---|---|
| ARITHMETIC EXPRESSION | $\dfrac{dz \cdot v_{u0}+(2^{n-1}-dz)v_{u6}}{2^{n-1}}$ |

DIVIDED SEGMENT 22

| POSITION | ON PLANE u0-u2-u6 (NOT INCLUDE BORDER) |
|---|---|
| ARITHMETIC EXPRESSION | $dy+dz-2^n=0$, $dz>0$, $dx-dz>0$, $dx+dz-2^n<0$ $$\frac{2dz \cdot v_{u0}+(2^n-dx-dz)\,v_{u2}+(dx-dz)v_{u6}}{2^n}$$ |

DIVIDED SEGMENT 23

| POSITION | ON PLANE u0—u5—u6 (NOT INCLUDE BORDER) |
|---|---|
| ARITHMETIC EXPRESSION | $dx+dz-2^n=0,\ dz>0,\ dy-dz>0,\ dy+dz-2^n<0$ $$\frac{2dx \cdot v_{u0}+(2^n-dy-dz)\,v_{u5}+(dy-dz)v_{u6}}{2^n}$$ |

DIVIDED SEGMENT 24

| POSITION | ON PLANE u1–u2–u6–u5 (NOT INCLUDE BORDER) |
|---|---|
| ARITHMETIC EXPRESSION | $\dfrac{dz=0,\ 0<dx<2^n,\ 0<dY<2^n}{2^{2n}}$ $(2^n-dx)(2^n-dy)\,v_{u1} + (2^n-dx)\,dy\cdot v_{u2} + dx(2^n-dy)\,v_{u5} + dx\cdot dy\cdot v_{u6}$ |

DIVIDED SEGMENT 25

POSITION  INSIDE OF QUADRANGULAR PYRAMID u0-u1-u2-u6-u5 (NOT INCLUDE BORDER PLANE)

$dz>0, dx-dz>0, dx+dz-2^n<0, dy-dz>0, dy+dz-2^n<0$

ARITHMETIC EXPRESSION $$2dz \cdot v_{u0} + \frac{(2^n-dx-dz)(2^n-dy-dz)v_{u1} + (2^n-dx-dz)(dy-dz)v_{u2} + (dx-dz)(2^n-dy-dz)v_{u5} + (dx-dz)(dy-dz)v_{u6}}{2^n-2dz}$$

$$2^n$$

DIVIDED SEGMENT 26

| POSITION | ON LINE u0-u8 (NOT INCLUDE ENDS) |
|---|---|
| | $dx=dy=dz, 2^{n-1}<dx<2^n$ |
| ARITHMETIC EXPRESSION | $\dfrac{(2^n-dx)v_{u0}+(dx-2^{n-1})v_{u8}}{2^{n-1}}$ |

DIVIDED SEGMENT 27

| | |
|---|---|
| POSITION | ON PLANE u0–u6–u8 (NOT INCLUDE BORDER) |
| ARITHMETIC EXPRESSION | $dx-dy=0,\ dx<2^n,\ dx-dz>0,\ dx+dz-2^n<0$ $$\frac{2(2^n-dx)\ v_{u0}+(dx-dz)\ v_{u7}+(dx+dz-2^n)\ v_{u8}}{2^n}$$ |

DIVIDED SEGMENT 28

| POSITION | ON PLANE u0–u7–u8 (NOT INCLUDE BORDER) |
|---|---|
| | $dx-dz=0,\ dz<2^n,\ dy-dz<0,\ dy+dz-2^n>0$ |
| ARITHMETIC EXPRESSION | $\dfrac{2(2^n-dx)\,v_{u0} + (dx-dy)\,v_{u7} + (dx+dy-2^n)\,v_{u8}}{2^n}$ |

DIVIDED SEGMENT 29

POSITION INSIDE OF QUADRANGULAR PYRAMID u0-u5-u6-u7-u8
(NOT INCLUDE BORDER PLANE)
$dx<2^n, dx-dz>0, dx+dz-2^n>0, dx-dy>0, dx+dy-2^n>0$

ARITHMETIC
EXPRESSION $$2(2^n-dx)v_{u0} + \frac{(dx-dy)(dx-dz)v_{u5} + (dx+dy-2^n)(dx-dz)v_{u6} + (dx-dy)(dx+dz-2^n)v_{u7} + (dx+dy-2^n)(dx+dz-2^n)v_{u8}}{2dx-2^n}$$

$$2^n$$

DIVIDED SEGMENT 30

| POSITION | ON PLANE u0-u4-u8 (NOT INCLUDE BORDER) $dy-dz=0$, $dy<2^n$, $dx-dy<0$, $dx+dy-2^n>0$ |
|---|---|
| ARITHMETIC | $\dfrac{2(2^n-dy)\, v_{u0} + (dy-dx)\, v_{u4} + (dx+dy-2^n)\, v_{u8}}{2^n}$ |

DIVIDED SEGMENT 31

| POSITION | INSIDE OF QUADRANGULAR PYRAMID $u0-u2-u4-u8-u6$ (NOT INCLUDE BORDER PLANE) $dy<2^n, dx-dy<0, dx+dy-2^n<0, dy-dz>0, dy+dz-2^n>0$ |
|---|---|
| ARITHMETIC EXPRESSION | $2(2^n-dy)v_{u0} + \dfrac{(dy-dx)(dy-dz)v_{u2} + (dy-dx)(dy+dz-2^n)v_{u4} + (dx+dy-2^n)(dy+dz-2^n)v_{u6} + (dx+dy-2^n)(dy-dz)v_{u8}}{2dy-2^n}$ |
| DIVIDED SEGMENT 32 | $2^n$ |

POSITION: INSIDE OF QUADRANGULAR PYRAMID u0-u3-u4-u8-u7 (NOT INCLUDE BORDER PLANE)

$dz<2^n, dy-dz<0, dy+dz-2^n>0, dx-dz<0, dx+dz-2^n>0$

ARITHMETIC EXPRESSION:

$$\frac{2(2^n-dz)v_{u0} + \frac{(dz-dx)(dz-dy)v_{u3}+(dz-dx)(dy+dz-2^n)v_{u4}+(dx+dz-2^n)(dy+dz-2^n)v_{u7}+(dx+dz-2^n)(dz-dy)v_{u8}}{2dz-2^n}}{2^n}$$

DIVIDED SEGMENT 33

DATA TRANSFORMATION SYSTEM PERFORMING DATA TRANSFORMATION EMPLOYING INTERPOLATING OPERATION

BACKGROUND OF THE INVENTION

1. Field of the Invention

The present invention relates to an interpolation method and a data transformation system. Specifically, the invention relates to a data transformation system. More specifically, the invention relates to an interpolation method to be employed together with a look-up table (hereinafter also referred to as "LUT) in data transformation, such as color transformation or so forth, and a data transformation system which executes interpolation.

2. Description of the Related Art

For example, when an image synthesized on a personal computer is output by a printer, it becomes necessary to perform color transformation of luminance signals R, G, B as image data into color signals Y, M, C, or into signals further including K in addition to the foregoing color signals, according to necessity. It is known that an input space defined by the luminance signals and an output space defined by the color signals in the color transformation have a non-linear relationship. When the relationship between the input and the output spaces is non-linear as stated above, it is not easy to precisely make a model of the transformation of the input space into the output space so as to perform an arithmetic operation. Also, even when the model can be made with a certain level or precision, it is possible that an amount of arithmetic operation required for the transformation per se becomes significant. In order to solve the problems in the data transformation, it has been known to perform the data transformation simply by preliminarily providing a table storing output data corresponding to respective input data.

However, even in such method, when the input space consists of 256 density levels with respect to each of signals R, G, B, for example, and when there is provided the table storing data of the output space corresponding to all data of the input space, an amount of data to be stored in the table becomes significant. Thus, in view of the cost for memory for the table, it is not practical. As a measure for this, it has been known to take a sample of the input space at an appropriate interval and make the table with respect to only sample points for reducing the amount of data stored. In this method, a transformed output data for a point other than the sample point (hereinafter also referred to as a grid point) of the input space is derived by a linear interpolation employing the grid point data of the sample points.

A three dimensional LUT is used in a three-dimensional transformation, in which input and output has a non-linear relation, such as color transformation of the luminance signals R, G, B into the color signals Y, M, C, or signals including a color signal K in addition to the foregoing color signals for three colors to be used in the printer. Thus, the three-dimensional LUT stores transformation data (hereinafter also referred to as grid point data) corresponding to respective grid points of a three-dimensional cubic grid formed by the input luminance signals R, G, B. For input corresponding to the point other than respective grid point in the three-dimensional cubic grid, a linear interpolating operation is performed with respect to an interpolation space expressed as a predetermined shape of a solid body containing the point to be transformed and having a given number of grid points as vertexes to obtain an output (transformed data) corresponding to the input.

An arithmetic expression for interpolation in a linear interpolation can be generally expressed as follows:

$$\sum_{i=1}^{k} C_i V_{ui}$$

wherein k is a number of grid points to be utilized for the interpolation, $v_{ui}$ is a value indicated by the data of grid point ui, and $c_i$ is a weighting coefficient.

For example, when k is eight, the interpolation to be performed becomes an eight point interpolation using eight grid point data. In this case, the interpolation space becomes cubic. On the other hand, when k is five, the interpolation to be performed becomes a five point interpolation using five grid point data. The shape of the solid body to express the interpolation space is then variable depending upon selection of the five grid points. When k is preliminarily determined as set forth above, and the input signals R, G, B are expressed as byte data, the grid point data $v_{ui}$ to be used are output from the LUT on the basis of the predetermined upper bits of the input signals R, G, B, and, on the other hand, the weighting coefficient $c_i$ in the foregoing expression is determined on the basis of the lower bit data indicative of a position of the input signals in the interpolation space, for example.

A manner of the operation of the interpolating arithmetic expression as set forth above may vary depending upon a region in the interpolation space where an interpolating objective point indicative of the position of the input signals is located. For instance, there are four cases; where the region where the interpolating objective point is located is the grid point in the solid body expressing the interpolation space, where the region is a line connecting the grid points, where the region is a plane defined by the lines connecting the grid points, and where the region is inside of the solid body (these regions will be hereinafter referred to as a calculation divided segment). Since the number of grid point data and/or weighting coefficient to be practically used in the interpolating operation is different in respective cases, the operation can be simplified corresponding to the number of the grid point data and the weighting coefficient to be actually used. More specifically, when the interpolating operation is performed by software, the number of times to make reference to the grid point data or so forth or number of times of arithmetic operation for addition, subtraction, multiplication, and division are differentiated in respect to the foregoing four cases. Therefore, depending upon the region where the interpolating objective point is located, the number of times of operations and so forth can be reduced. For example, when the interpolating objective point is located on the grid point, the number of times of performing the operation can be minimum. On the other hand, when the interpolating objective point is located on the line connecting the grid point, the number of times of performing the operation can be second smallest.

Accordingly, the degree of simplification of the overall interpolating operation is determined by the number of respective interpolating objective points included in respective calculation divided segments within interpolating objective points designated by overall input signals. Assuming that the space defined by the overall input data is fixed, relatively greater number of grid points, namely, greater amount of data to be stored in the table, increases the probability that the interpolating objective point is located on the grid point or on the line connecting the grid points to achieve a greater degree of simplification. However, the required capacity of the table memory is increased. On the other hand, depending upon the shape of the solid body selected as the interpolating space, the degree of simplification is variable. At any rate, employing a simplified interpolating arithmetic expression is effective for reducing the overall interpolating arithmetic operation while the degree of simplification is variable.

SUMMARY OF THE INVENTION

It is therefore an object of the present invention to provide an interpolating operation method and a data transformation system which can reduce the amount of arithmetic operation.

Another object of the present invention is to provide an interpolating operation method and a data transformation system, which can simplify the arithmetic expression upon performing the interpolating operation depending upon a divided segment in an interpolation space where an interpolating objective point is located, by employing an interpolating arithmetic expression corresponding to the divided segment in an interpolation space, such as belonging on a grid point in the interpolation space, belonging on a line connecting grid points or so forth.

In a first aspect of the present invention, there is provided a method for an interpolating operation comprising the steps of:

making a judgement as to which divided segment of an interpolation space each point is located at, for all of points to be object for interpolating operation in an interpolation space;

storing each divided segment thus judged in a storage means with correspondence to each point, respectively;

detecting the divided segment corresponding to an objective point for the interpolating operation with reference to the storage means, upon performing the interpolating operation; and deriving an interpolation value of the objective point for interpolation by a predetermined arithmetic expression set corresponding to the divided segment detected.

In a second aspect of the present invention, there is provided a data transformation apparatus for transforming one data space into another data space, comprising:

a look-up table storing transformation data composing another data space, corresponding to grid points defined in the one data space;

a divided segment calculating means for determining as to which divided segment of an interpolation space defined by a plurality of the grid points in the one data space each point is located, for all points to be an objective point for interpolating operation using transformation data of the grid points;

a storage means for storing each the divided segment determined by the divided segment calculating means with correspondence to each the points, respectively;

a divided segment detecting means for detecting the divided segment corresponding to an objective point for interpolation defined by data to be transformed upon performing data transformation for the data in the one data space with making reference to the storage means; and an interpolation operating means for performing interpolating operation utilizing the transformation data stored in the look-up table on a basis of arithmetic expression determined corresponding to the divided segment determined by the divided segment determining means and deriving a transformed data relating to the data to be transformed.

In a third aspect of the present invention, there is provided a data transformation system for transforming one data space into the other data space, comprising:

a look-up table storing transformation data composing the the other data space, corresponding to grid points defined in the one data space;

a divided segment calculating means for determining as to which divided segment of an interpolation space defined by a plurality of the grid points in the one data space each point is located, for all points to be the objective point for interpolating operation using transformation data of the grid points;

a storage means for storing each the divided segment determined by the divided segment calculating means with correspondence to each point, respectively;

a divided segment detecting means for detecting the divided segment corresponding to an objective point for an interpolation defined by data to be transformed upon performing data transformation for the data in the one data space with reference to the storage means; and an interpolation operating means for performing an interpolating operation utilizing the transformation data stored in the look-up table on a basis of an arithmetic expression determined corresponding to the divided segment determined by the divided segment determining means and deriving a transformed data relating to the data to be transformed.

In a fourth aspect of the present invention, there is provided a printing system for performing printing on a basis of data derived by transformation of one data space into another data space, comprising:

a look-up table storing transformation data composing another data space, corresponding to grid points defined in the one data space;

a divided segment calculating means for determining as to which divided segment of an interpolation space defined by a plurality of the grid points in the one data space each point is located, for all points to be an objective point for an interpolating operation using transformation data of the grid points;

a storage means for storing each divided segment determined by the divided segment calculating means with correspondence to each point, respectively;

a divided segment detecting means for detecting the divided segment corresponding to an objective point for interpolation defined by data to be transformed upon performing data transformation for the data in the one data space with reference to the storage means; and an interpolation operating means for performing an interpolating operation utilizing the transformation data stored in the look-up table on a basis of arithmetic expression determined corresponding to the divided segment determined by the divided segment determining means and deriving a transformed data relating to the data to be transformed.

In a fifth aspect of the present invention, there is provided a storage medium storing a program readable by a computer, wherein the program includes steps of:

making a judgement as to which divided segment of an interpolation space each point is located, for all of points to be object for an interpolating operation in an interpolation space;

storing each divided segment thus judged in a storage means with correspondence to each point, respectively;

detecting the divided segment corresponding to an objective point for an interpolating operation with reference to the storage means, upon performing an interpolating operation; and deriving an interpolation value of the objective point for interpolation by a predetermined arithmetic expression set corresponding to the divided segment detected.

In a sixth aspect of the present invention, there is provided a data forming method comprising the steps of:

making a judgement as to which divided segment of an interpolation space each point is located, for all points to be an object for an interpolating operation in an interpolation space; and storing each the divided segments thus judged in a storage means with correspondence to each point, respectively.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

Figure 24:
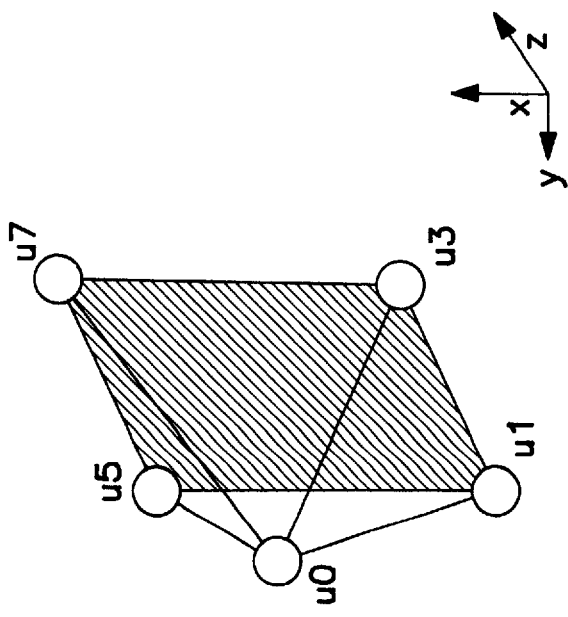
Figure 25:
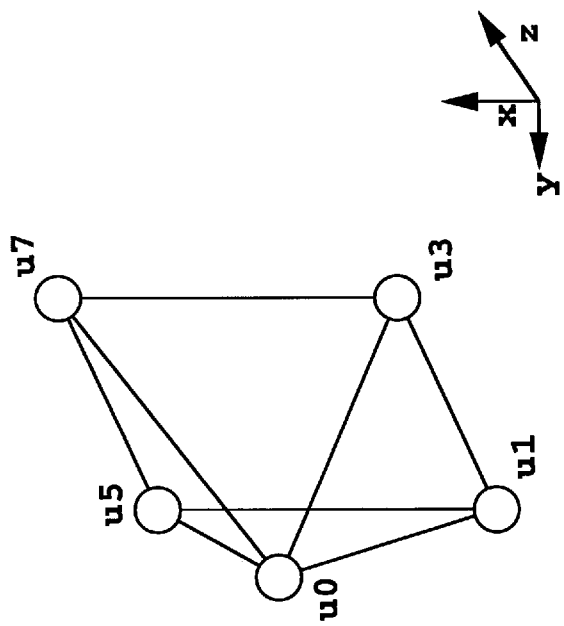
Figure 26:
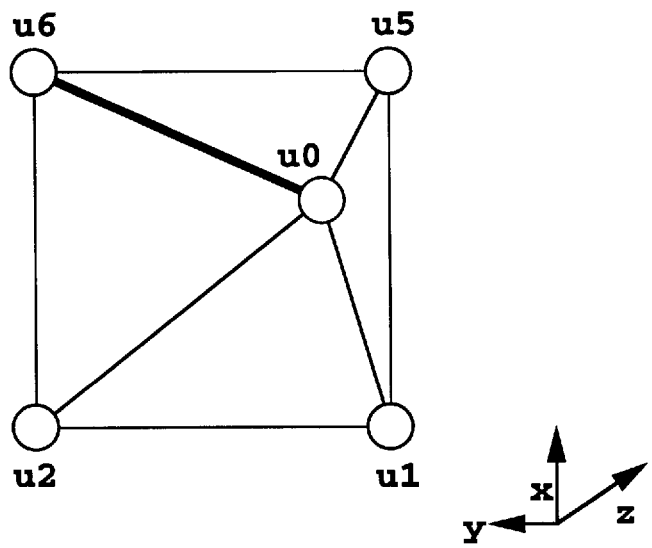
Figure 27:
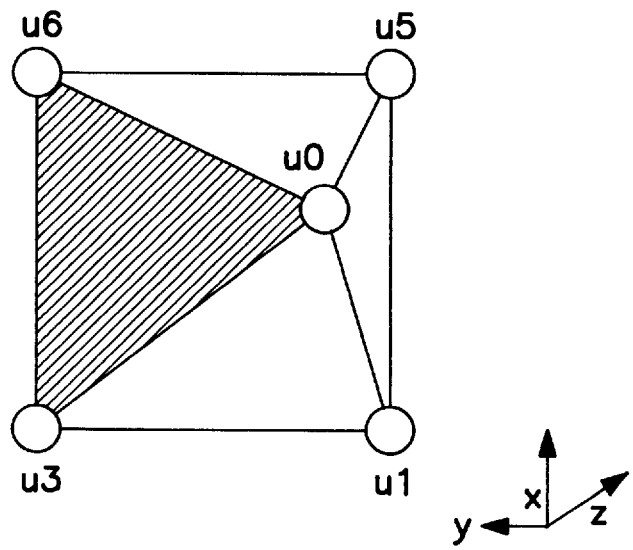
Figure 28:
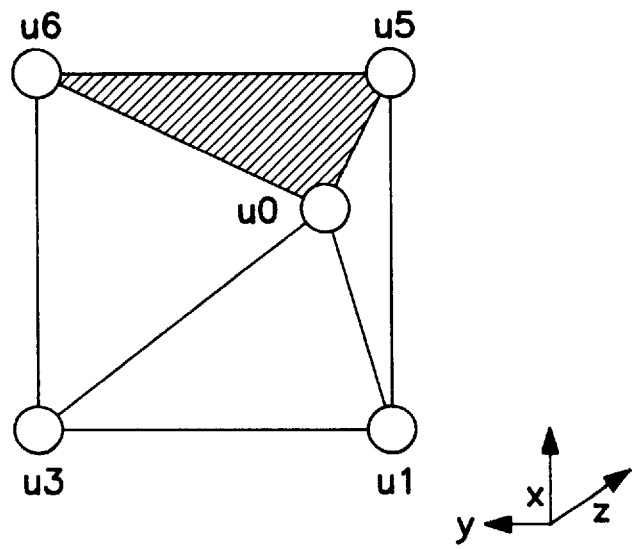
Figure 29:
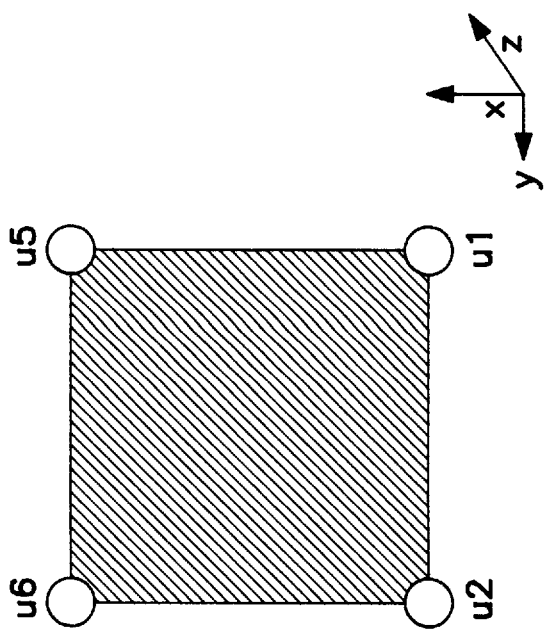
Figure 30:
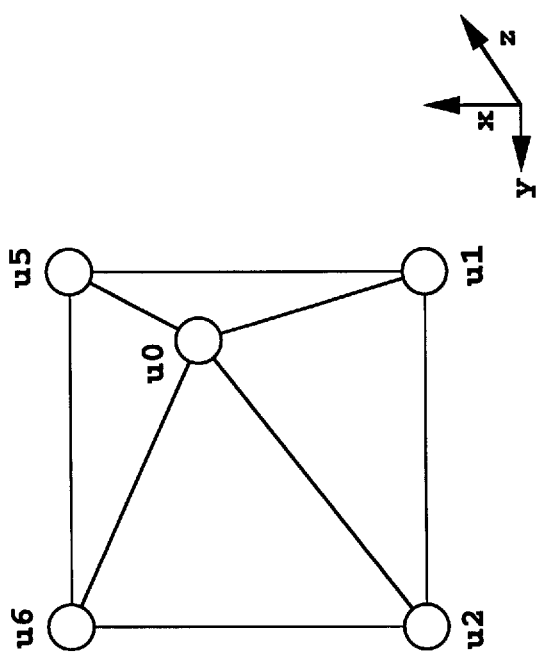
Figure 31:
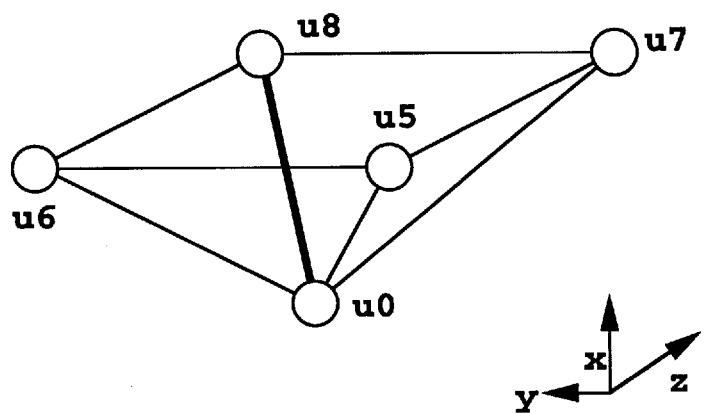
Figure 32:
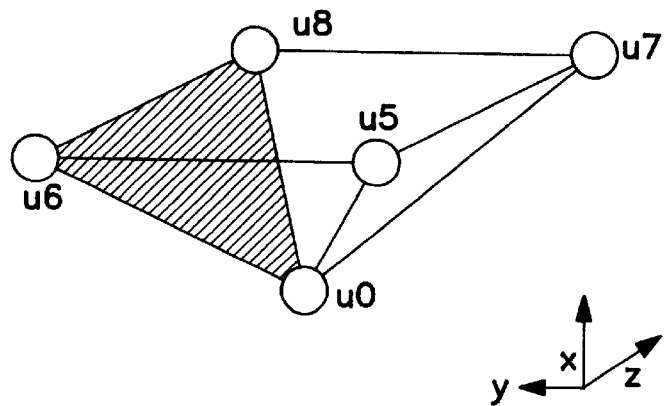
Figure 33:
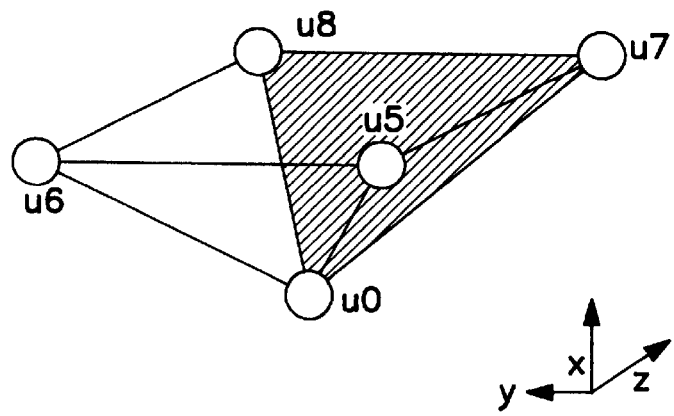
Figure 34:
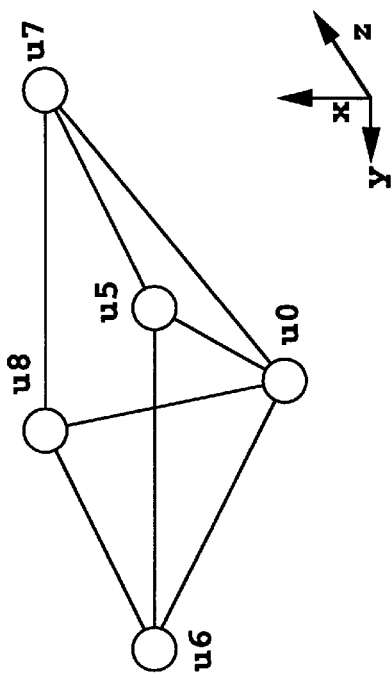
Figure 35:
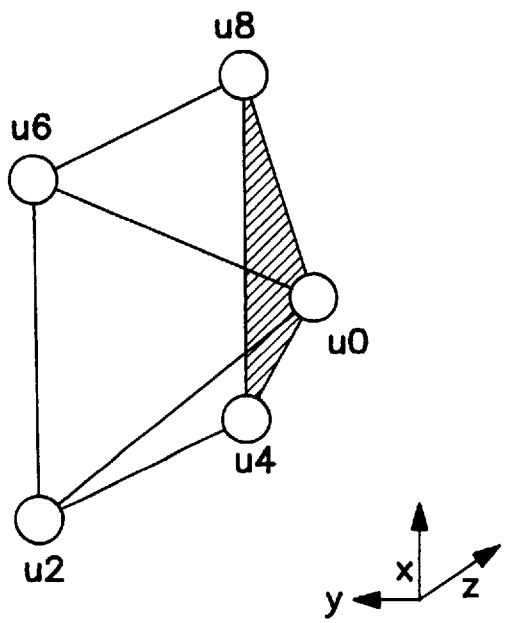
Figure 36:
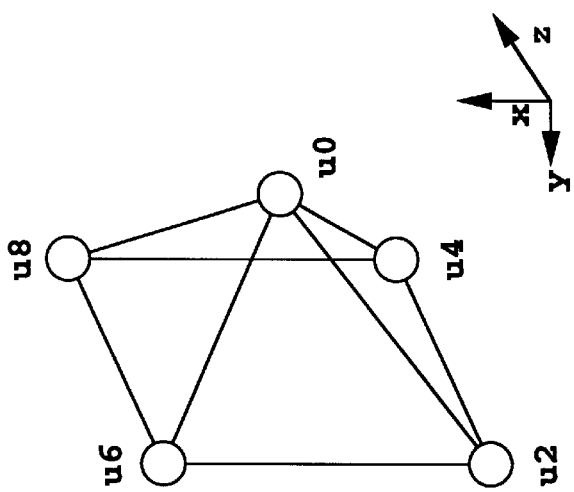
Figure 37:
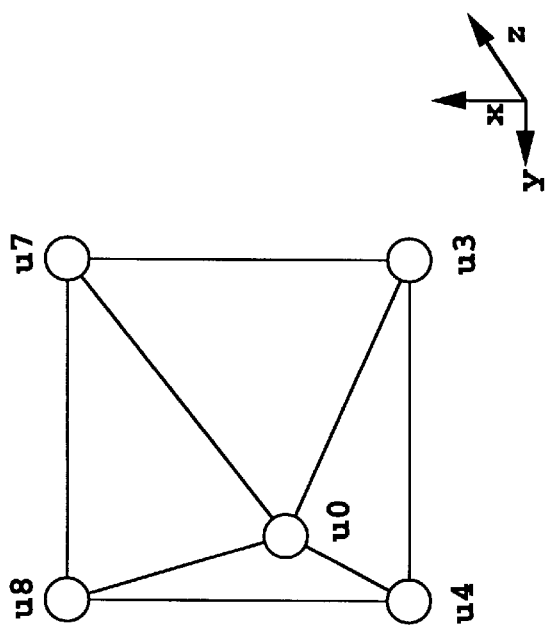
Figure 38:
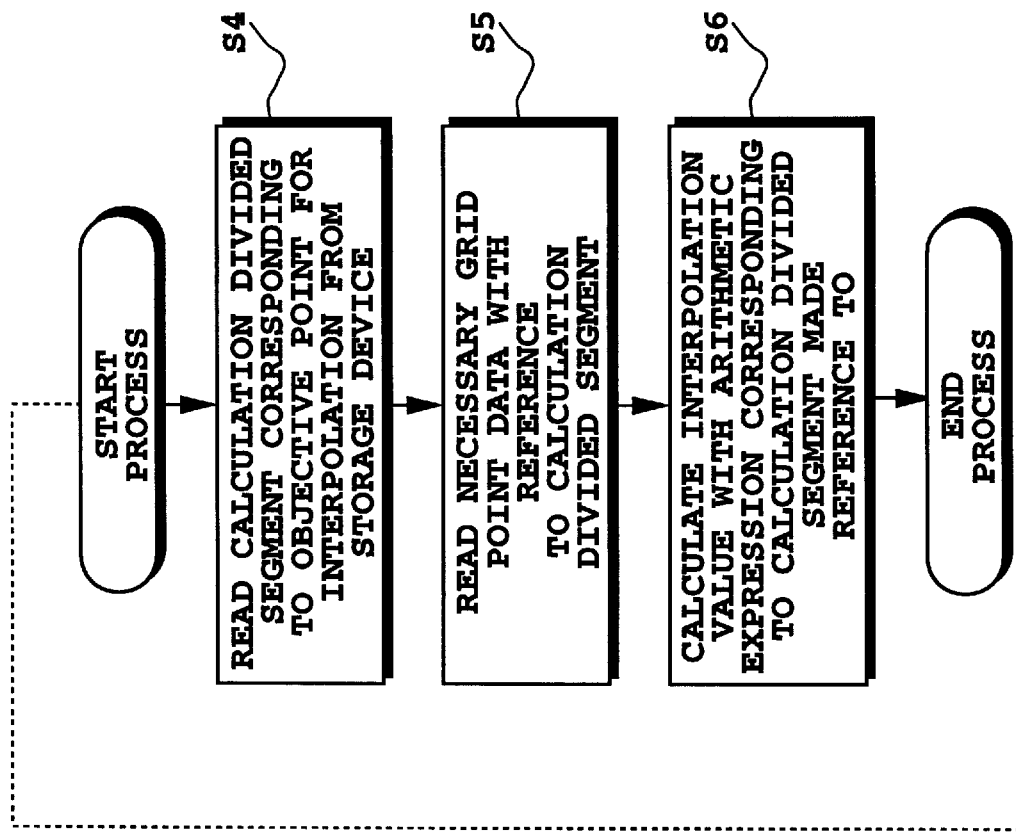
Figure 38:
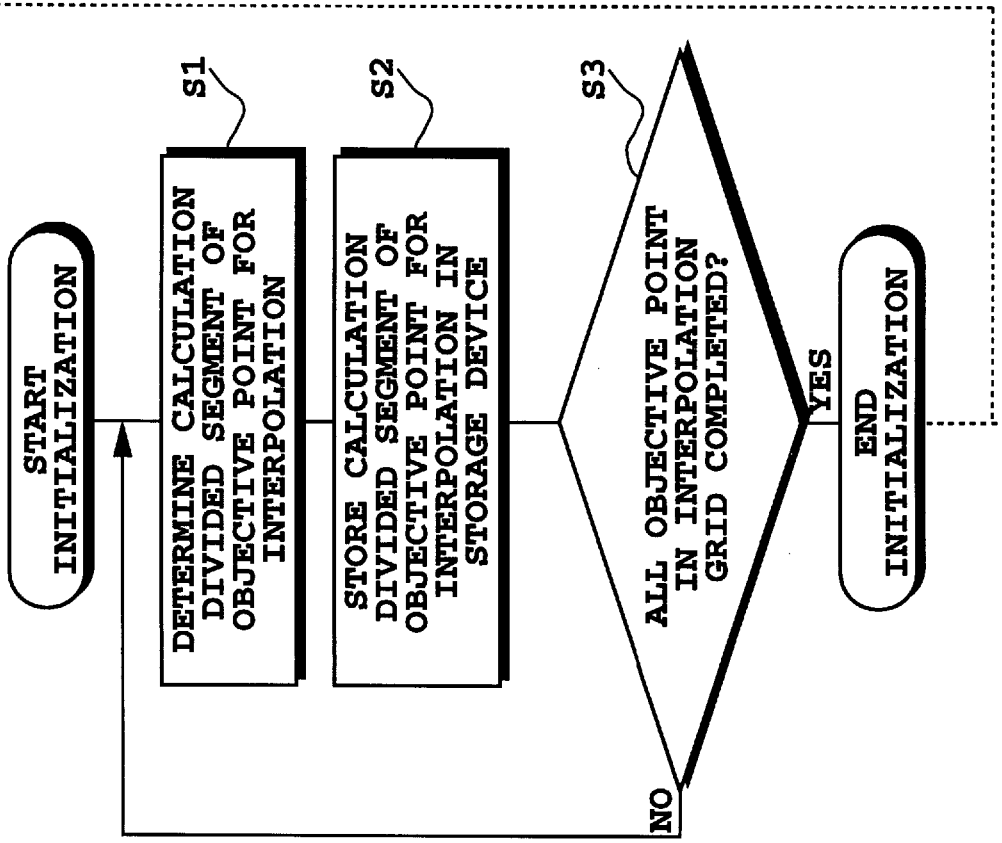
Figure 39:
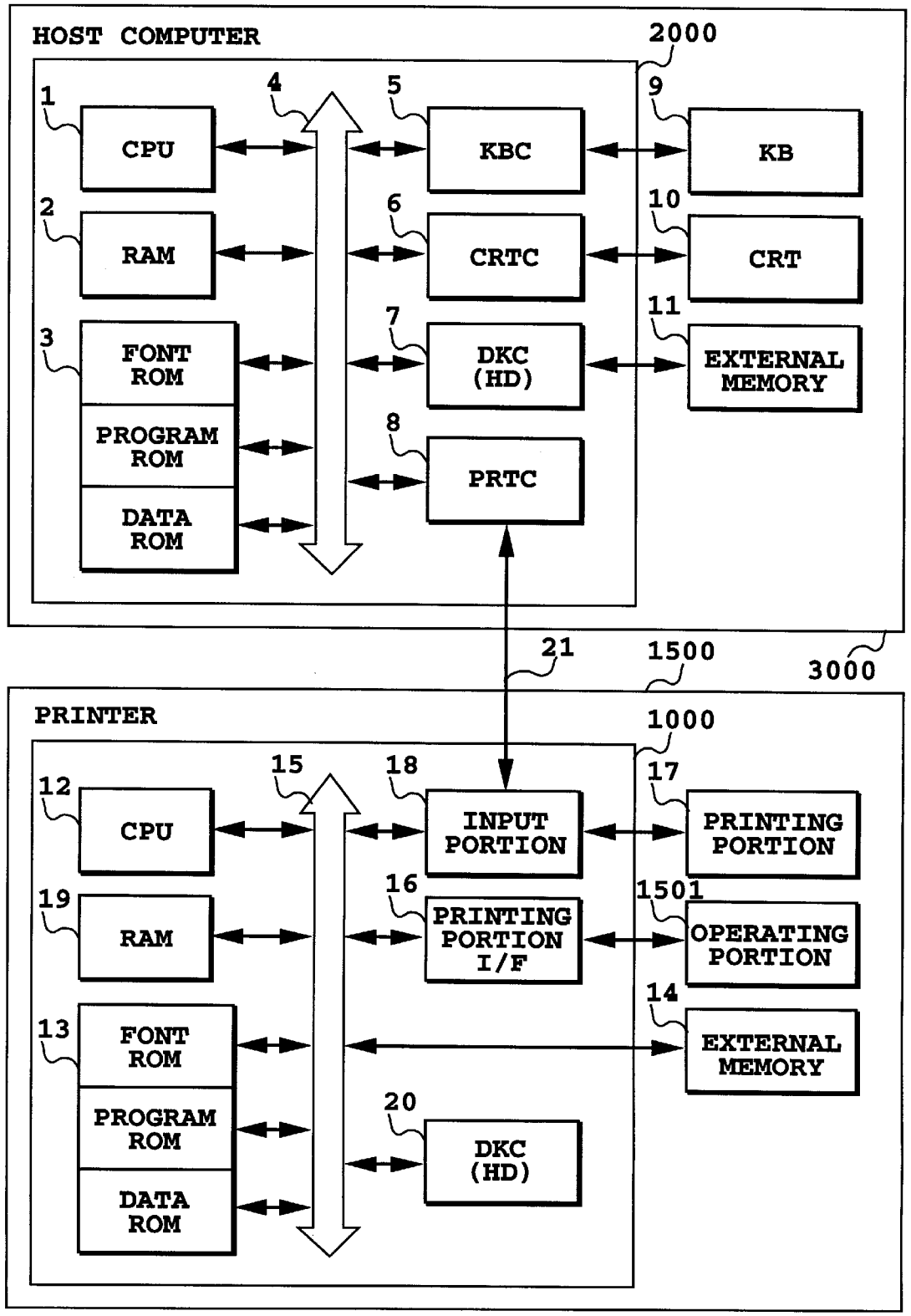

FIG. 24 is an illustration for explaining a position condition and an interpolating arithmetic expression in an interpolating solid space of a calculation divided segment 20 denoted by one embodiment of an interpolating arithmetic operation according to the invention;

FIG. 25 is an illustration for explaining a position condition and an interpolating arithmetic expression in an interpolating solid space of a calculation divided segment 21 denoted by one embodiment of an interpolating arithmetic operation according to the invention;

FIG. 26 is an illustration for explaining a position condition and an interpolating arithmetic expression in an interpolating solid space of a calculation divided segment 22 denoted by one embodiment of an interpolating arithmetic operation according to the invention;

FIG. 27 is an illustration for explaining a position condition and an interpolating arithmetic expression in an interpolating solid space of a calculation divided segment 23 denoted by one embodiment of an interpolating arithmetic operation according to the invention;

FIG. 28 is an illustration for explaining a position condition and an interpolating arithmetic expression in an interpolating solid space of a calculation divided segment 24 denoted by one embodiment of an interpolating arithmetic operation according to the invention;

FIG. 29 is an illustration for explaining a position condition and an interpolating arithmetic expression in an interpolating solid space of a calculation divided segment 25 denoted by one embodiment of an interpolating arithmetic operation according to the invention;

FIG. 30 is an illustration for explaining a position condition and an interpolating arithmetic expression in an interpolating solid space of a calculation divided segment 26 denoted by one embodiment of an interpolating arithmetic operation according to the invention;

FIG. 31 is an illustration for explaining a position condition and an interpolating arithmetic expression in an interpolating solid space of a calculation divided segment 27 denoted by one embodiment of an interpolating arithmetic operation according to the invention;

FIG. 32 is an illustration for explaining a position condition and an interpolating arithmetic expression in an interpolating solid space of a calculation divided segment 28 denoted by one embodiment of an interpolating arithmetic operation according to the invention;

FIG. 33 is an illustration for explaining a position condition and an interpolating arithmetic expression in an interpolating solid space of a calculation divided segment 29 denoted by one embodiment of an interpolating arithmetic operation according to the invention;

FIG. 34 is an illustration for explaining a position condition and an interpolating arithmetic expression in an interpolating solid space of a calculation divided segment 30 denoted by one embodiment of an interpolating arithmetic operation according to the invention;

FIG. 35 is an illustration for explaining a position condition and an interpolating arithmetic expression in an interpolating solid space of a calculation divided segment 31 denoted by one embodiment of an interpolating arithmetic operation according to the invention;

FIG. 36 is an illustration for explaining a position condition and an interpolating arithmetic expression in an interpolating solid space of a calculation divided segment 32 denoted by one embodiment of an interpolating arithmetic operation according to the invention;

FIG. 37 is an illustration for explaining a position condition and an interpolating arithmetic expression in an interpolating solid space of a calculation divided segment 33 denoted by one embodiment of an interpolating arithmetic operation according to the invention;

FIG. 38 is a flowchart showing a procedure for one embodiment of color transformation process according to the invention; and FIG. 39 is a block diagram showing a concrete embodiment of a printing system, to which the present invention is applied.

DESCRIPTION OF THE PREFERRED EMBODIMENT

An embodiment of the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to not unnecessarily obscure the present invention.

Figure 1:
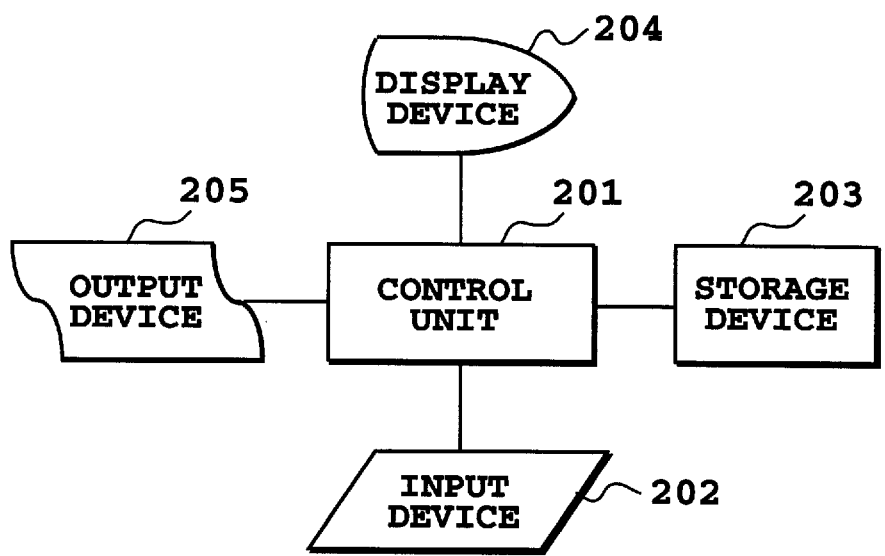
FIG. 1 is a block diagram showing a construction of one embodiment of an image processing system according to the present invention.

FIG. 1 is a block diagram showing one embodiment of an image processing system of a data transformation system according to the present invention.

An output device 205 can be an ink-jet type color printer, for example, for performing color printing output on a printing sheet while employing four colors of inks of yellow (Y), magenta (M), cyan (C) and black (K). Print data consisted of respective density data of Y, M, C, K employed in the output device 205, can be obtained by image processing executed by a control unit 201. The image processing includes a color transformation process discussed later.

The control unit 201 has a CPU and executes operation control of data processing or various mechanical elements relating to the shown system, such as color transformation discussed later and initialization process therefor, and so forth. A storage device 203 is constituted of a memory, such as a ROM, a RAM or so forth, an external storage devices, such as a hard disk, a floppy disk or so forth, in which a look-up table and calculation divided segments discussed later are stored in one embodiment of the present invention.

For example, an image read by a scanner is stored in the storage device 203, and an operator of the shown system performs a desired process for the image displayed on a display device 204, such as a CRT or so forth by operation input through an input device 202, such as a keyboard, a mouse and so forth to prepare an image for printing output by the output device 205.

The image thus produced by the shown system generally consists of tone data of respective of luminance signals R, G, B. In order to attain printing data for the output device 205 from the tone data of the luminance signals, a color transformation discussed later, has to be performed.

It should be noted that an application of the present invention should not be limited to the system set forth above. For instance, it has been well known that a color transformation process is performed in the system, such as a copy machine or so forth. It should be obvious that the present invention is applicable even in such appropriate system or apparatus.

Figure 2:
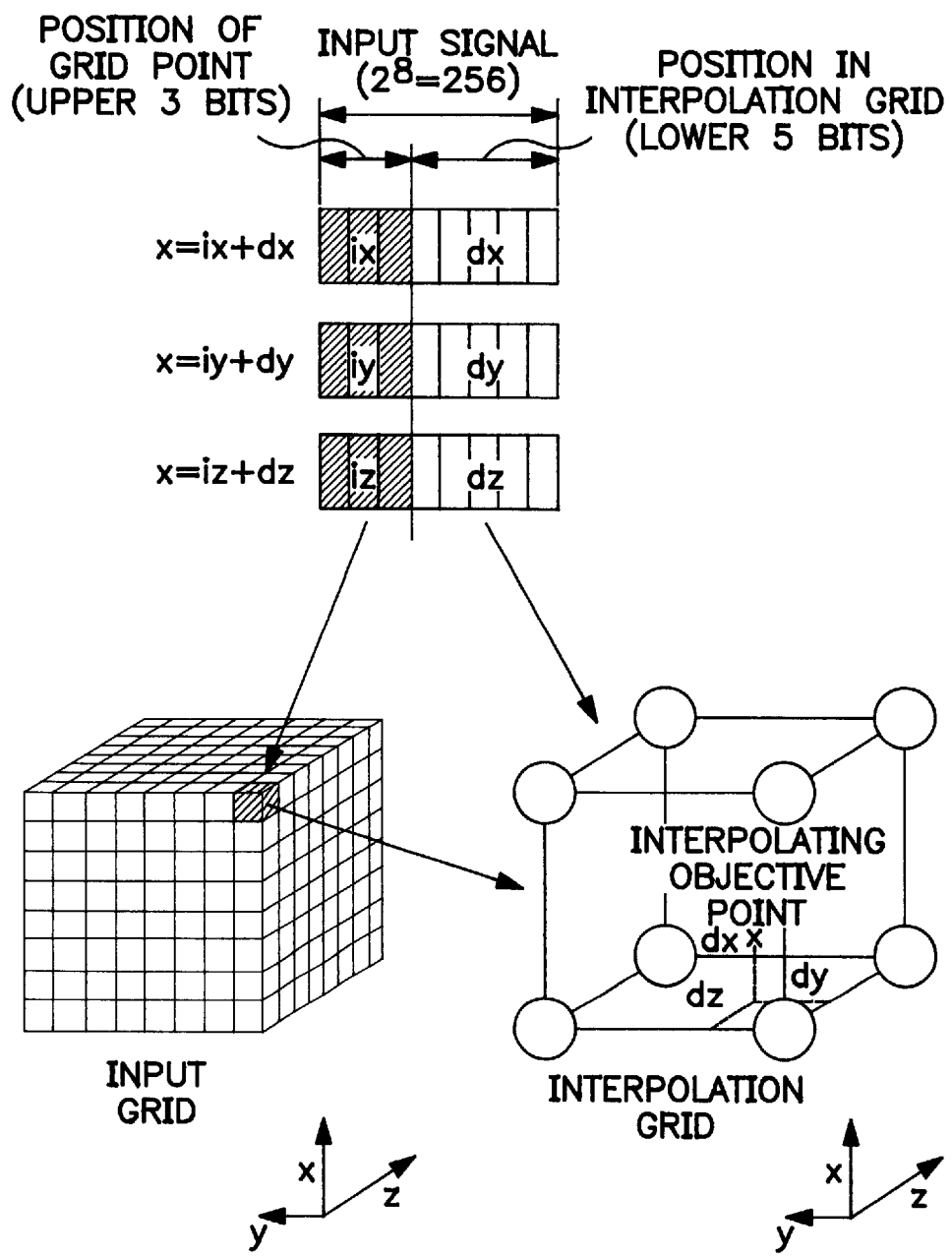
FIG. 2 is an explanatory illustration for explaining a color transformation of three-dimensional input consisted of R, G, B signals.

FIG. 2 is an illustration for explaining a concept of a general color transformation.

In FIG. 2, for example, the luminance signals R, G, B are assumed as 8 bit signals x, y and z, and are expressed as luminance data of at 256 tones to have values within a range of 0 to 255. Upper 3 bit samples ix, iy and iz of respective signals x, y and z define a sample point when an input space defined of whole input signals x, y and z is sampled at a given interval. The whole of these sample points defines an input grid. Thus, the upper bit signals ix, iy and iz are used for defining an interpolation space (hereinafter also referred to as interpolation grid) in the input grid. More specifically, signals (ix, iy, iz) define a coordinate of one grid point in the input grid. On the basis of these signals, 8 grid points including the grid point defined by (ix, iy, iz) are defined, and whereby the interpolation grid is defined. This means that a look-up table (hereinafter also referred to as LUT) is made reference to with 8 address data in the practical color transformation. It should be noted that this 8 addressing reference is carried in case of 8 points interpolation, and number of address data is differentiated depending upon the interpolation method. Furthermore, in the preferred embodiment of the present invention, the number of address data to be used, cannot become the same for all of the cases set out later.

Lower 5 bit data dx, dy and dz of the input signals x, y and z represents a a position of the input signal, i.e. an interpolating objective point in the interpolation grid defined in the manner set forth above. In the practical interpolating operation, these data dx, dy and dz are used as weighting coefficients of interpolating operation employing the grid point data read out from the LUT based on the foregoing address data.

As can be clear from the discussion set forth above, with respect to each of the input signals x, y, z, grid points corresponding to respective tones which is defined by dividing 256 tones into 8 levels. Further, the grid point data corresponding to the grid points are stored in the LUT. On the other hand, between the grid points are divided corresponding to 32 tone levels to define the interpolating objective points. Thus, in each interpolation lattice, $32^3 = 32768$ of interpolating objective points can be defined.

Figure 3:
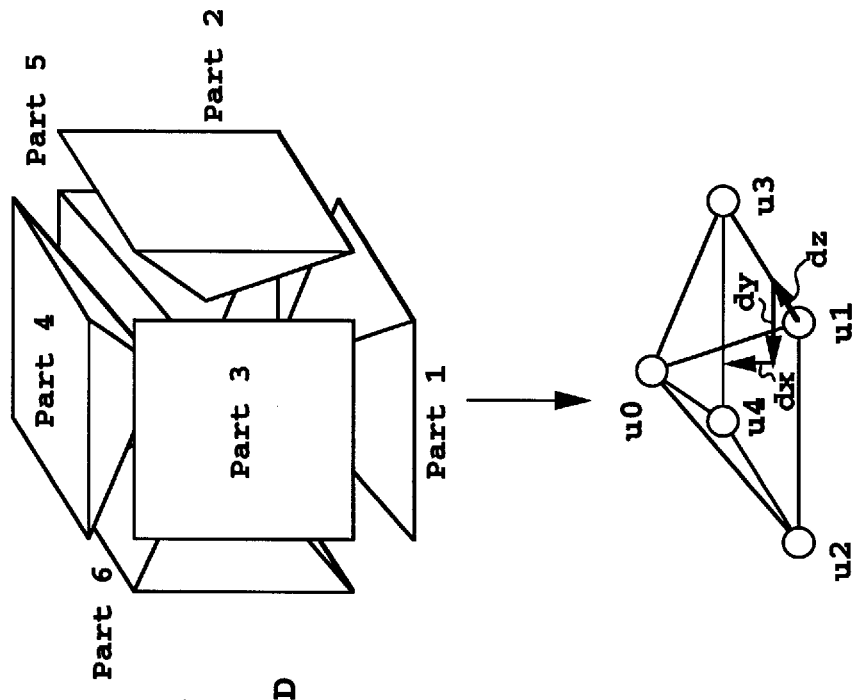
FIG. 3 is an explanatory illustration for explaining one embodiment of an interpolating system according t the invention.
Figure 3:
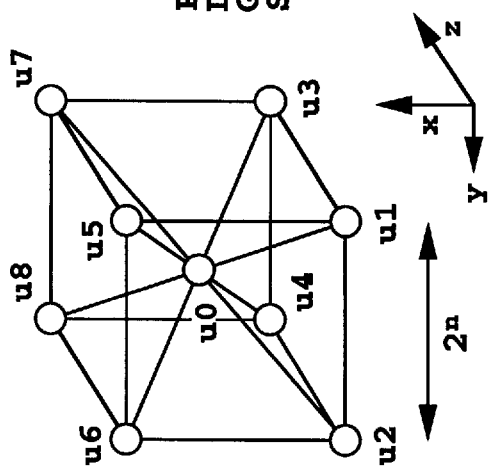

FIG. 3 is an illustration for explaining an interpolation system to be employed in the shown embodiment. More specifically, in the shown embodiment, the interpolation grid discussed with respect to FIG. 2, is further divided into 6 quadrangular pyramids Part 1 to Part 6, and the interpolating operation is performed with respect to an interpolating solid body of the quadrangular pyramid. This interpolation system is called a pyramid interpolation as one of 5 point interpolation systems. For this system, in addition to the grid points u1 to u8 set forth with respect to FIG. 2, a sub-grid point u0 is defined in each interpolation grid. Namely, the grid point data of the grid point u0 is stored in the individual LUT. Address data of the sub-grid point u0 is also derived by a predetermined operation from respective upper bits of the input signals x, y and z.

In FIG. 3, one of interpolation solid bodies (u0, u1, u2, u4, u3) defined as set forth above is shown. A result of an interpolating operation of the interpolating objective point a positioned in the interpolation solid body can be derived by the following an interpolating arithmetic expression employing grid point data of grid points u0, u1, u2, u4, u3 and the lower bit data dx, dy, dz, for example.

$$(v_{u0} \times (2 \times dx) + (v_{u1} \times (2^n - dy - dx) \times (2^n - dz - dx) +$$
$$v_{u2} \times (dy - dx) \times (2^n - dz - dx) +$$
$$v_{u3} \times (2^n - dy - dx) \times (dz - dx) +$$
$$v_{u4} \times (dy - dx) \times (dz - dx))/(2^n - 2 \times dx))/2^n$$

where n represents number of lower bits of the input signal.

The an interpolating operation set forth above can be calculated according to the general formula as set forth above. In the shown embodiment, a simplified operation is executed without using the foregoing general formula in all cases. More specifically, the control unit 201 (see FIG. 1) executes an operation according to a predetermined processing procedure, and the arithmetic operation is differentiated depending upon the region in the an interpolating solid body expressed by a quadrangular pyramid where the interpolating objective point is located. By this, in the overall an interpolating operation, the number of times to make reference to LUT and the number of times to perform arithmetic operations of addition, subtraction, multiplication and division required for obtaining the grid point data can be reduced.

In the shown embodiment, an arithmetic expression is varied depending upon a position of the an interpolating objective point, on the grid point, on a line connecting grid points, on a plane defining the lines, or within the an interpolating solid body. A divided segment thus divided by the arithmetic expression in the interpolating solid body will hereinafter be referred to as calculation divided segment. The calculation divided segments are defined by dividing one an interpolating three-dimensional cubic grid shown in FIG. 3 into 34 divided segments of divided segments 0 to 34, as shown in FIGS. 4 to 37. It should be noted that interpolating expressions to be employed in corresponding calculation divided segments are additionally shown in these drawings.

Figure 4:
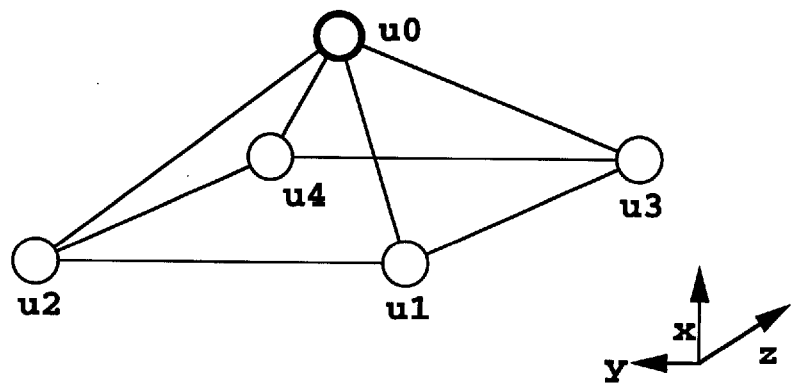
FIG. 4 is an illustration for explaining a position condition and an interpolating arithmetic expression in an interpolating solid space of a calculation divided segment 0 denoted by one embodiment of an interpolating arithmetic operation according to the invention.
Figure 5:
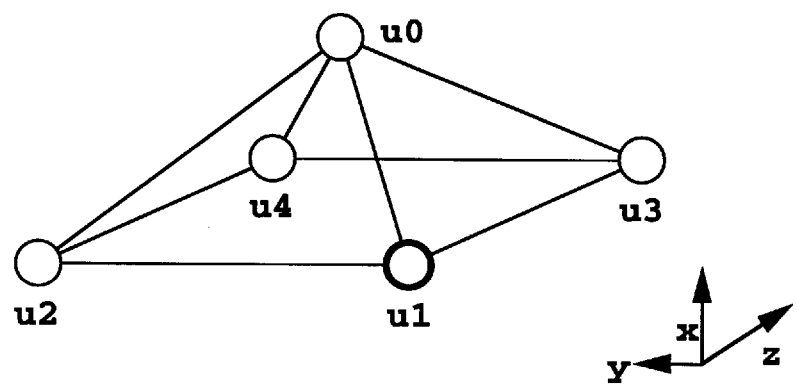
FIG. 5 is an illustration for explaining a position condition and an interpolating arithmetic expression in an interpolating solid space of a calculation divided segment 1 denoted by one embodiment of an interpolating arithmetic operation according to the invention.

Divided segments 0 and 1 respectively shown in FIGS. 4 and 5 are the cases where the an interpolating objective points are a positioned at grid points u0 and u1, respectively. In this case, respective grid point data vu0 and vu1, namely the data read from the table become the results of interpolation. Thus, an arithmetic operation for addition, subtraction, multiplication, and division can be neglected.

It should be noted that when the interpolating objective point is located on other grid points u2, u3, and u4 in the interpolating solid body shown in FIGS. 4 and 5, the grid points u2, u3, and u4 can be taken similarly to the grid point u1 in the interpolating operation in other interpolating grid adjacent to the interpolating grid shown in FIG. 3. Accordingly, in one an interpolating three-dimensional cubic grid, the interpolating objective point becomes the a position of the grid and becomes the object of calculation in the interpolating grid is in only two cases as shown in divided segments 0 and 1.

As shown in FIGS. 6 to 9, 18, 19, 26 and 31 and FIGS. 10, 11 and 20, the divided segments 2 to 5, 14, 15, 22, 27 and divided segments 6, 7 and 16 are the cases where the interpolating objective points are positioned on the lines connecting respective grid points. In this case, in the example shown by the divided segment 2 shown in FIG. 6, for example, as can be clear from the arithmetic expression shown in FIG. 6, result of interpolation can be obtained by making reference to the LUT twice, and performing one time of addition and subtraction and two times of multiplication while employing two grid point data $v_{u0}$ and $v_{u1}$. It should be noted that the straight line becomes the calculation divided segment in one interpolating three-dimensional cubic grid, only when the straight line is one of 8 straight lines commonly owned as contour lines of respective quadrangular pyramids and one of 3 straight lines defining a bottom surface of the quadrangular pyramid.

Figure 16:
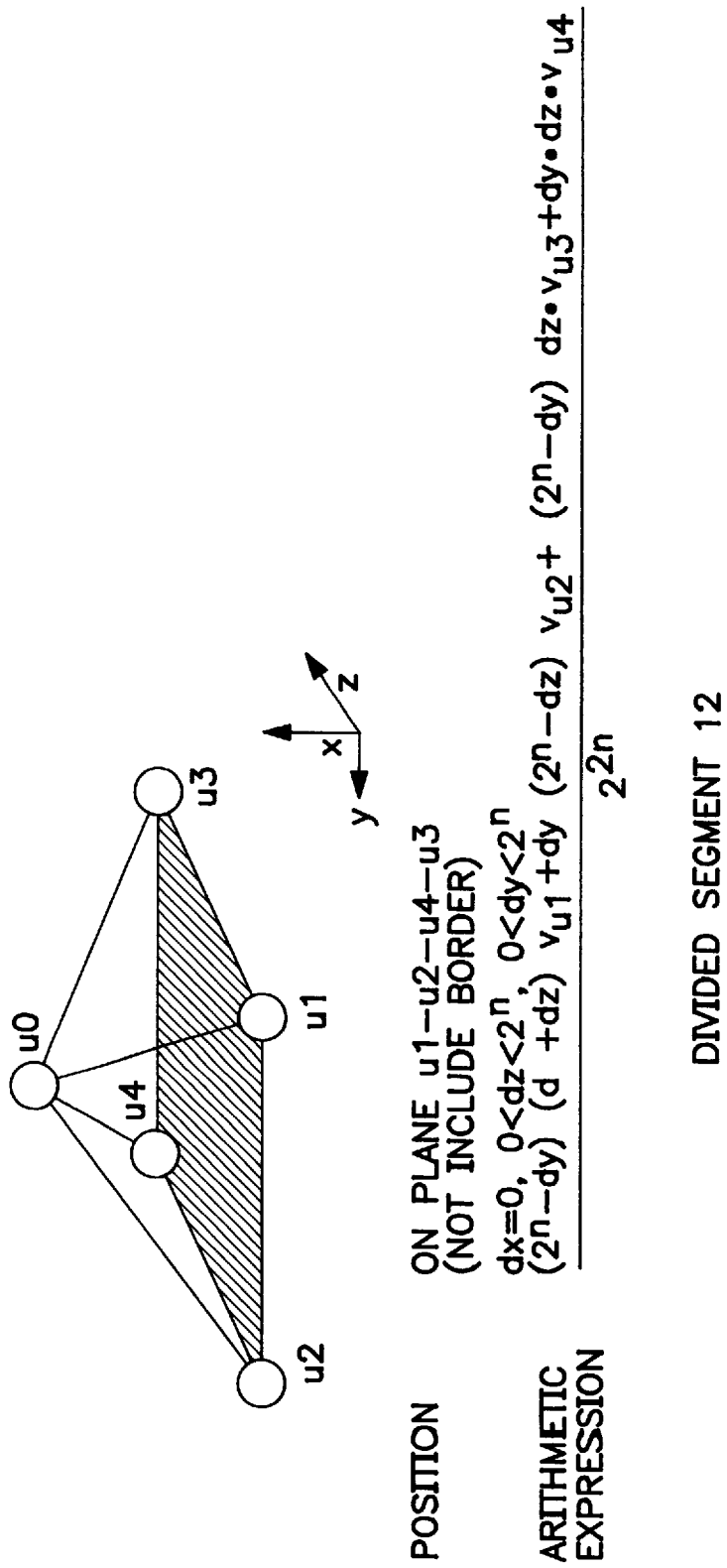
FIG. 16 is an illustration for explaining a position condition and an interpolating arithmetic expression in an interpolating solid space of a calculation divided segment 12 denoted by one embodiment of an interpolating arithmetic operation according to the invention.
Figure 17:
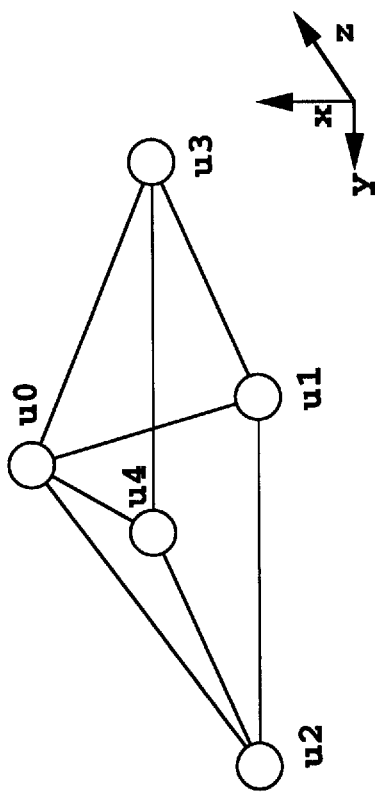
FIG. 17 is an illustration for explaining a position condition and an interpolating arithmetic expression in an interpolating solid space of a calculation divided segment 13 denoted by one embodiment of an interpolating arithmetic operation according to the invention.
Figure 18:
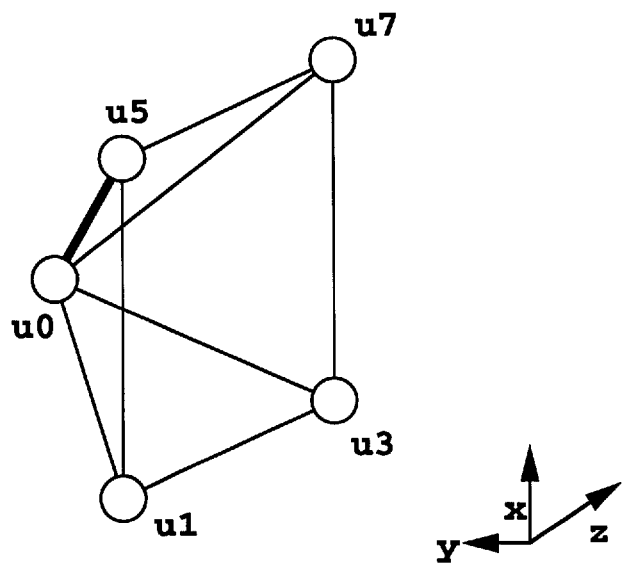
FIG. 18 is an illustration for explaining a position condition and an interpolating arithmetic expression in an interpolating solid space of a calculation divided segment 14 denoted by one embodiment of an interpolating arithmetic operation according to the invention.
Figure 19:
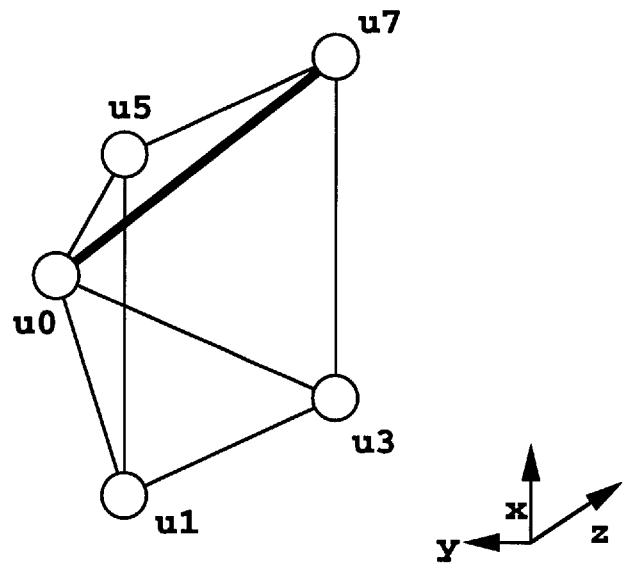
FIG. 19 is an illustration for explaining a position condition and an interpolating arithmetic expression in an interpolating solid space of a calculation divided segment 15 denoted by one embodiment of an interpolating arithmetic operation according to the invention.
Figure 20:
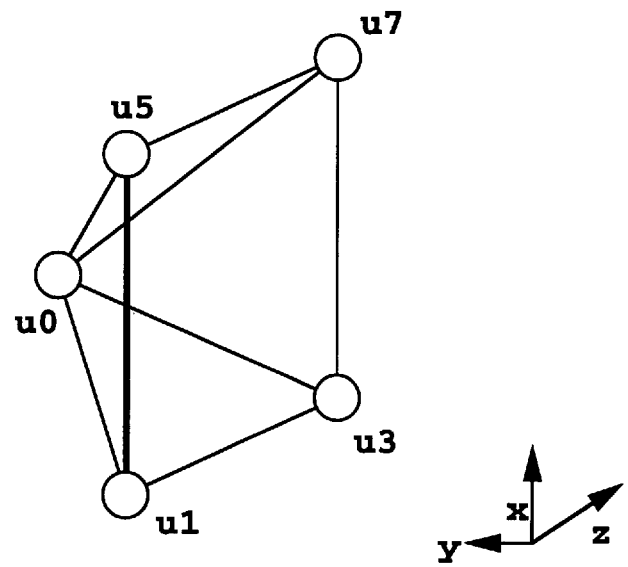
FIG. 20 is an illustration for explaining a position condition and an interpolating arithmetic expression in an interpolating solid space of a calculation divided segment 16 denoted by one embodiment of an interpolating arithmetic operation according to the invention.
Figure 21:
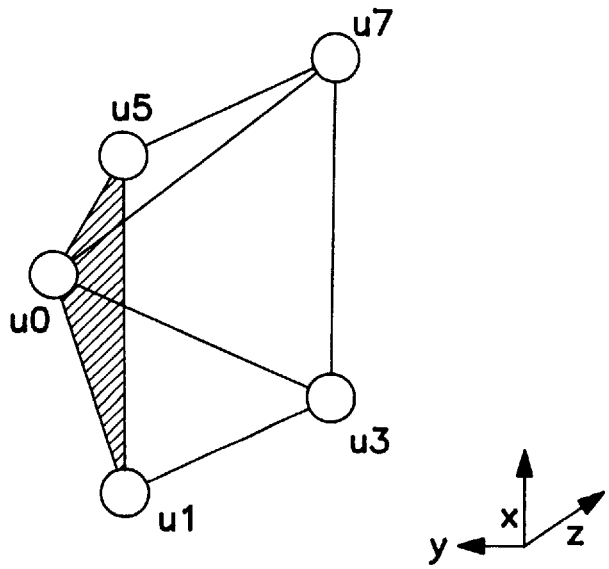
FIG. 21 is an illustration for explaining a position condition and an interpolating arithmetic expression in an interpolating solid space of a calculation divided segment 17 denoted by one embodiment of an interpolating arithmetic operation according to the invention.
Figure 22:
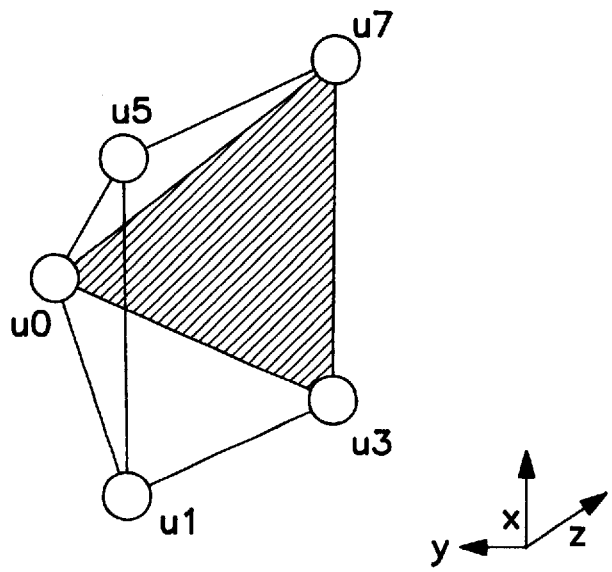
FIG. 22 is an illustration for explaining a position condition and an interpolating arithmetic expression in an interpolating solid space of a calculation divided segment 18 denoted by one embodiment of an interpolating arithmetic operation according to the invention.
Figure 23:
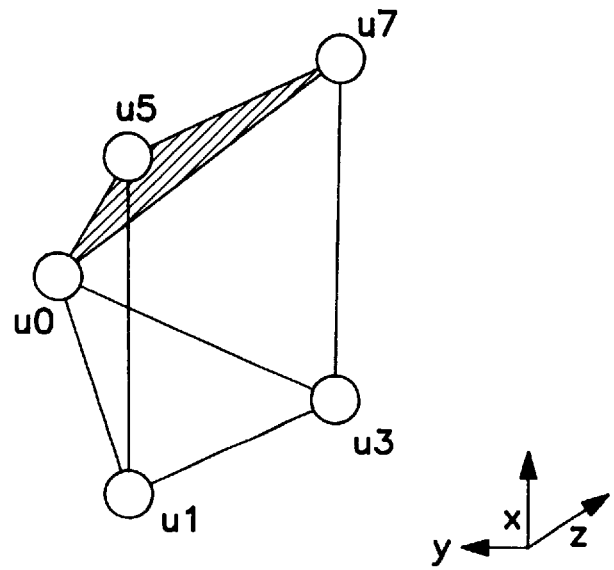
FIG. 23 is an illustration for explaining a position condition and an interpolating arithmetic expression in an interpolating solid space of a calculation divided segment 19 denoted by one embodiment of an interpolating arithmetic operation according to the invention.

Furthermore, the divided segments 8 to 11, 17 to 19, 23, 24, 28, 29 and 31 shown in FIGS. 12 to 15, 21 to 23, 27, 28, 32, 33 and 35 are the cases where the interpolating objective point is located on the planes on the quadrangular pyramids as respective interpolating solid bodies, and the divided segments 12, 20 and 25 shown in FIGS. 16, 24 and 29 are the cases where the interpolating objective point is located on the bottom plane of the quadrangular pyramids. The planes becomes the calculation divided segment in one an interpolating cubic grid as described above when the plane is one of 3 bottom plane of respective quadrangular pyramids and one of 12 planes of respective quadrangular pyramids.

Finally, the divided segments 13, 21, 26, 30, 32 and 33 shown in FIGS. 17, 25, 30, 34, 36 and 37 are the cases where the interpolating objective point is located within respective quadrangular pyramids.

In respective divided segments discussed above, the number of times to make the LUT reference to (number of grid points) or number of times of arithmetic operation for addition, subtraction, multiplication and division are shown in the following tables 1 to 3.

In the table 1 to 3, the value shown in the "grid point number" corresponds to the number of times to make reference to LUT or the number of LUTs to make reference to, or value indicated in "addition (labeled as "+")", "subtraction (labeled as "−")", "multiplication (labeled as "×")" and "division (labeled as "÷")" are the number of times of calculation. On the other hand, "number of objective point in the interpolation grid" shows the number of an interpolating objective points possibly a positioned in the divided segment.

TABLE 1

| Divided segment | u0 | u1 | u2 | u3 | u4 | u5 | u6 | u7 | u8 | Grid Point Number | Number of Objective Point in Interpolation Grid | + | − | × | ÷ |
|---|---|---|---|---|---|---|---|---|---|---|---|---|---|---|---|
| 0 | ○ | | | | | | | | | 1 | 1 | 0 | 0 | 0 | 0 |
| 1 | | ○ | | | | | | | | 1 | 1 | 0 | 0 | 0 | 0 |
| 2 | ○ | ○ | | | | | | | | 2 | $2^{n-1} - 1$ | 1 | 1 | 2 | 1 |
| 3 | ○ | | ○ | | | | | | | 2 | $2^{n-1} - 1$ | 1 | 1 | 2 | 1 |
| 4 | ○ | | | ○ | | | | | | 2 | $2^{n-1} - 1$ | 1 | 1 | 2 | 1 |
| 5 | ○ | | | | ○ | | | | | 2 | $2^{n-1} - 1$ | 1 | 1 | 2 | 1 |
| 6 | | ○ | ○ | | | | | | | 2 | $2^n - 1$ | 1 | 1 | 2 | 1 |
| 7 | | ○ | | ○ | | | | | | 2 | $2^n - 1$ | 1 | 1 | 2 | 1 |
| 8 | ○ | ○ | ○ | | | | | | | 3 | $(2^{n-1} - 1)^2$ | 2 | 3 | 4 | 1 |
| 9 | ○ | ○ | | ○ | | | | | | 3 | $(2^{n-1} - 1)^2$ | 2 | 3 | 4 | 1 |
| 10 | ○ | | | ○ | ○ | | | | | 3 | $(2^{n-1} - 1)^2$ | 2 | 3 | 4 | 1 |
| 11 | ○ | | ○ | | ○ | | | | | 3 | $(2^{n-1} - 1)^2$ | 2 | 3 | 4 | 1 |

TABLE 2

| Divided segment | u0 | u1 | u2 | u3 | u4 | u5 | u6 | u7 | u8 | Grid Point Number | Number of Objective Point in Interpolation Grid | + | − | × | ÷ |
|---|---|---|---|---|---|---|---|---|---|---|---|---|---|---|---|
| 12 | | ○ | ○ | ○ | ○ | | | | | 4 | $(2^n - 1)^2$ | 3 | 4 | 8 | 1 |
| 13 | ○ | ○ | ○ | ○ | ○ | | | | | 5 | $(2^{n-1} - 1)(2^n - 1)(2^2 - 3)/3$ | 4 | 13 | 11 | 2 |
| 14 | ○ | | | | | ○ | | | | 2 | $2^{n-1} - 1$ | 1 | 1 | 2 | 1 |
| 15 | ○ | | | | | | ○ | | | 2 | $2^{n-1} - 1$ | 1 | 1 | 2 | 1 |
| 16 | | ○ | | | ○ | | | | | 2 | $2^n - 1$ | 1 | 1 | 2 | 1 |
| 17 | ○ | ○ | | | ○ | | | | | 3 | $(2^{n-1} - 1)^2$ | 2 | 3 | 4 | 1 |
| 18 | ○ | | ○ | | | ○ | | | | 3 | $(2^{n-1} - 1)^2$ | 2 | 3 | 4 | 1 |
| 19 | ○ | | | | ○ | ○ | | | | 3 | $(2^{n-1} - 1)^2$ | 2 | 3 | 4 | 1 |
| 20 | | ○ | | ○ | ○ | ○ | | | | 4 | $(2^n - 1)^2$ | 3 | 4 | 8 | 1 |
| 21 | ○ | ○ | | ○ | ○ | ○ | | | | 5 | $(2^{n-1} - 1)(2^n - 1)(2^n - 3)/3$ | 4 | 13 | 11 | 2 |
| 22 | ○ | | | | | | | ○ | | 2 | $2^{n-1} - 1$ | 1 | 1 | 2 | 1 |

TABLE 3

| Divided segment | u0 | u1 | u2 | u3 | u4 | u5 | u6 | u7 | u8 | Grid Point Number | Number of Objective Point in Interpolation Grid | + | − | × | ÷ |
|---|---|---|---|---|---|---|---|---|---|---|---|---|---|---|---|
| 23 | ○ | | ○ | | | | | ○ | | 3 | $(2^{n-1} - 1)^2$ | 2 | 3 | 4 | 1 |
| 24 | ○ | | | | | ○ | | ○ | | 3 | $(2^{n-1} - 1)^2$ | 2 | 3 | 4 | 1 |
| 25 | | | ○ | ○ | | | ○ | ○ | | 4 | $(2^n - 1)^2$ | 3 | 4 | 8 | 1 |
| 26 | ○ | ○ | ○ | | | | ○ | ○ | | 5 | $(2^{n-1} - 1)(2^n - 1)(2^n - 3)/3$ | 4 | 13 | 11 | 2 |
| 27 | ○ | | | | | | | | ○ | 2 | $2^{n-1} - 1$ | 1 | 1 | 2 | 1 |
| 28 | ○ | | | | | ○ | | | ○ | 3 | $(2^{n-1} - 1)2$ | 2 | 3 | 4 | 1 |
| 29 | ○ | | | | | | ○ | | ○ | 3 | $(2^{n-1} - 1)2$ | 2 | 3 | 4 | 1 |
| 30 | ○ | | | | ○ | ○ | ○ | | ○ | 5 | $(2^{n-1} - 1)(2^n - 1)(2^n - 3)/3$ | 4 | 13 | 11 | 2 |
| 31 | ○ | | | ○ | | | | | ○ | 3 | $(2^{n-1} - 1)2$ | 2 | 3 | 4 | 1 |
| 32 | ○ | | | ○ | ○ | | ○ | | ○ | 5 | $(2^{n-1} - 1)(2^n - 1)(2^n - 3)/3$ | 4 | 13 | 11 | 2 |
| 33 | ○ | | ○ | ○ | | ○ | | | ○ | 5 | $(2^{n-1} - 1)(2^n - 1)(2^n - 3)/3$ | 4 | 13 | 11 | 2 |

In the case that the number of an interpolating objective points included in one interpolation grid is assumed to be $(2^n)^3$ (n represents number of lower bits of the input signal, and $2^n$ represents an interval of the interpolation grid. In the shown embodiment, n=5), it should be appreciated, as can be clear from the foregoing table 1 to 3, that respective calculation divided segments, and number of grids to be used for calculation in respective divided segments and number of times of arithmetic calculations have a predetermined relationship, and when n is relatively small value, such as 3, 4 and 5, the ratio of the number of interpolating objective points in the calculation divided segment, in which the number of times of calculation is small, in the overall an interpolating objective period in the lattice, is small. Accordingly, particularly in such case, application of the shown embodiment of the calculation method is effective.

FIG. 38 is a flowchart showing procedure of the shown embodiment of color transformation process.

Amongst, steps S4 to S6 are performed as a part of image processing in synchronism with printing output by the printer as the output device 205. On the other hand, processes at steps S1 to S3 are executed at least in advance of color transformation for printing output. The calculation divided segment as a result of process thus executed preliminarily, is stored in the storage device 203. However, the process at steps S1 to S3 performed at any timing in advance of a color transformation process should be obviously included in the scope of the present invention.

Figure 6:
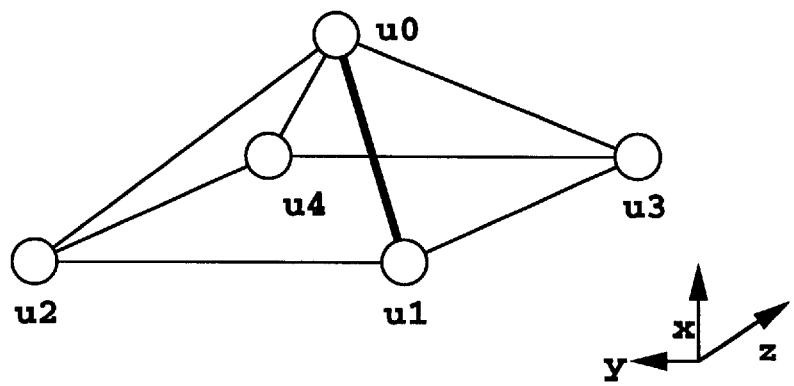
FIG. 6 is an illustration for explaining a position condition and an interpolating arithmetic expression in an interpolating solid space of a calculation divided segment 2 denoted by one embodiment of an interpolating arithmetic operation according to the invention.
Figure 7:
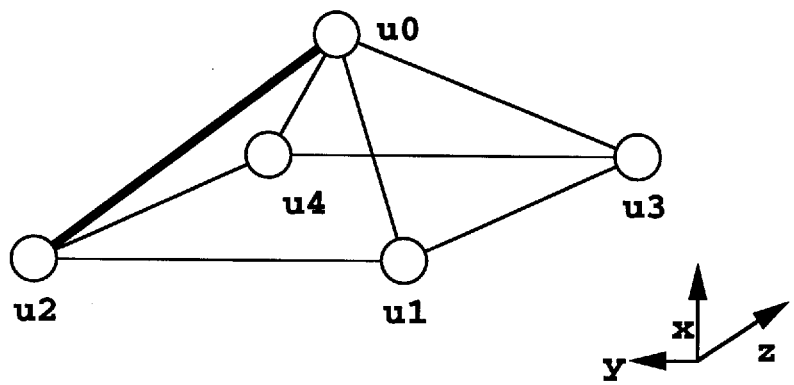
FIG. 7 is an illustration for explaining a position condition and an interpolating arithmetic expression in an interpolating solid space of a calculation divided segment 3 denoted by one embodiment of an interpolating arithmetic operation according to the invention.

In FIG. 38, at step S1, as an initialization process for color transformation process, calculation divided segments are calculated for all of the interpolating objective point (dx, dy, dz) of the interpolation grid (see FIG. 2). The calculation divided segment is determined by substituting dx, dy, dz for the conditional expression indicative of regions of respective calculation divided segment shown in FIGS. 4 to 37, for example, in such order from divided segment 0 to divided segment 33 that number of grid points made reference is minimized, and by taking the first calculation divided segment satisfying the conditional expression as the calculation divided segment for the interpolating objective point in question. For example, as shown in FIG. 6, when (dx, dy, dz) satisfies the expressions dx=dy=dz and $0<dx<2^n-1$, the interpolating objective point in question is determined to be involved in the divided segment 2 as the calculation divided segment.

Calculation of the calculation divided segment of the interpolating objective point is initiated from (dx, dy, dz)=(0, 0, 0) and increase the values of dx, dy, dz in z-axis direction, y-axis direction and x-axis direction until (dx, dy, dz=31, 31, 31) for facilitating retrieval of the LUT storing the calculation divided segments.

At step S2, the calculation divided segments obtained at step S1 are stored in the LUT which is realized by linearly arranging 32768 in number of elements in the storage device 203. Namely, the data indicative of the calculation divided segment obtained with respect to (dx, dy, dz) at step S1 is stored as (1024dx+32dy+dz)th element of the linear arrangement. It should be noted that the calculation divided segment obtained at step S1 may be temporarily stored in an external storage medium, such as a floppy disk (FD) and load in the LUT reading out from FD according to necessity.

At step S3, judgement is made whether calculation for determining the calculation divided segments has been completed up to (dx, dy, dz)=(31, 31, 31). If judgement not being completed is made, the process is returned to step S1 to perform the calculation for determining the calculation divided segment for the next an interpolating objective point. Through the foregoing process, the calculation divided segments of all of the points to be the interpolating object in respective interpolation grid can be calculated. The results of calculation set forth above is stored in the LUT of the storage device 203. By performing calculation for determining the calculation divided segments with respect to all of the interpolating objective point and storing the result in a form of a table, it becomes unnecessary to perform a calculation for determining the calculation divided segment each time when performing the interpolating operation.

At step S4, for respectively 8 bits input signals of R, G, B, a corresponding calculation divided segment data is read out from the LUT in the storage device 203 with taking (dx, dy, dz) as the lower 5 bit signal as an index. Next, at step S5. on the basis of the calculation divided segment data read out at step S4, judgement for the necessary grid point data is performed. Thereafter, reference is made to the LUT storing the grid point data of the storage device 203 on the basis of the upper 3 bits (ix, iy, iz) of respective of three 8 bit input signals for reading out necessary grid point data. For example, when the calculation divided segment read out at step S4 is the divided segment 2 as shown in FIG. 6, grid point data $v_{u0}$ and $v_{u1}$ of the grid points u0 and u1 are read out, respectively.

At step S6, with respect to the grid point data read out at step S5, an interpolating operation is executed by the control unit 201 utilizing the arithmetic expression corresponding to the calculation divided segment read out at step S4. Thus, the interpolation value of the interpolating objective point, namely, the printing output data Y, M, C corresponding to the inputs R, G, B is obtained. For example, when the calculation divided segment is the divided segment 2 of FIG. 6, the interpolation value is derived by the arithmetic expression (dx, $v_{u0}+(2^{n-1}-dx)v_{u1})/2^n-1$. The foregoing processes of steps S4 to S6 are repeated as long as input data is present.

In the shown embodiment set forth above, a period of time to be saved in an interpolating operation for one interpolating objective point is not large. However, in the case where a large amount of an interpolating operation is needed for several tends thousands point or more, such as in the image processing of the shown embodiment, the period of time to be saved by the shown system becomes significant.

It should be noted that while the shown embodiment has been discussed with respect to five point interpolation known as a pyramid interpolation system as the interpolation system, it should be obvious to those skilled in the art to apply the present invention to an interpolation system employing other interpolating solid bodies by utilizing the calculation divided segment corresponding to the interpolating solid body.

As set forth above, with the shown embodiment, when an interpolating operation is performed, the interpolating arithmetic expressions can be selectively used depending upon the divided segment in the interpolation space, in which the interpolating objective point is located, such as on the grid point on the interpolation space, on the line connecting the grid points and so forth. Thus, respective arithmetic expressions can be simplified adapting to the divided segments.

As a result, it becomes unnecessary to meaninglessly perform making reference to data and calculation. Therefore, increasing the speed of the interpolating operation and data transformation can be achieved.

FIG. 39 is a block diagram showing a more concrete construction of the shown embodiment of a printing system. The system shown in FIG. 39 is generally constructed by connecting an ink-jet type printer 1500 to a host computer 3000, such as a personal computer.

The host computer 3000 has a CPU 1 for executing document processing, in which drawings, images, characters, tables (including table calculations and so forth) and so forth are mixingly combined in accordance with a document processing program stored in ROM for program in ROM 3. Respective devices connected to a system device 4 are concentrically controlled by the CPU 1.

In the ROM for program in the ROM 3, the program relating to the color transformation process shown in FIG. 38 is stored. It should be noted that the image processing program may be stored in an external memory 11, such as a floppy disk (FD) or so forth, so that the user may use the program arbitrarily. In this case, the program of the external memory 11 to be installed is loaded in a RAM 2 via a disk controller (DKC) for enabling the CPU 1 to read out the program.

In FIG. 39, a reference numeral 5 denotes a keyboard controller (KBC) for controlling key input from a keyboard 9 or a not shown pointing device. A reference numeral 6 denotes a CRT controller (CRTC) for controlling display on a CRT display (CRT). A reference numeral 7 denotes the disk controller (DKC) for controlling access to the external memory 11, such as a hard disk drive (HD), a floppy disk drive (FD) or so forth storing a boot program, various application, font data, user file, editing file and so forth. A reference numeral 8 denotes a printer controller (PRTC) connected to the printer 1500 via a predetermined bidirectional interface (an interface 21) to perform a communication control process with the printer 1500. It should be noted that the CPU 1 executes rasterization of an outline font to display an information RAM set on the RAM 2, for enabling WYSIWYG on the CRT 10. On the other hand, the CPU 1 opens various windows registered on a basis of commands designated by a not shown mouse cursor or so forth on the CRT 10 to execute various data processing.

On the other hand, in the printer 1500, a reference numeral 12 denotes a printer CPU which concentrically controls access to various devices connected to a system bus 15 on a basis of a control program or so forth stored in the program ROM in a ROM 13 or a control program or so forth stored in an external memory 14 for outputting an image signal as output information to a printing portion (printer engine) 17 connected via a printing portion interface 16.

The CPU 12 can perform a communication process with the host computer via an input portion for feeding information within the printer to the host computer 3000. A reference numeral 19 denotes a RAM serving as a main memory, work area and so forth, which can be expanded in memory capacity by an optional RAM connected to a not shown extension port. It should be noted that the RAM 19 is also used for an output information developing region, an environment data storage region, NVRAM and so forth. The external memory 14, such as the hard disk (HD), IC card or so forth is controlled access thereto by the disk controller (DKC) 20. The external memory 14 is connected as an option. A reference numeral 18 denotes an operation panel, on which switches for operation and LED display and so forth are arranged.

On the other hand, the external memory is not limited to one, but is provided as at least one. Furthermore, it is possible to connect a plurality of external memories, such as option font card adding printing font in addition to built-in fonts, the external memory storing programs for interpreting printer control language in a different language system. In addition, the printer may be provided with the NVRAM for storing a printing mode setting information from the operating portion 1501.

It should be noted that the apparatus to performing printing output is of course not limited to the ink-jet type printer, but can be other type apparatus, such as a laser beam printer. In such case, the image processing program may be executed by a CPU in the laser beam printer. Also, a similar system can be constructed as a copy machine. In such case, as the mechanical construction of the laser beam copy machine, a known construction may be employed. Therefore, discussion for the mechanical construction of the laser beam copy machine is neglected.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A method of performing an interpolating operations comprising the steps of:

making a judgment as to which divided segment of an interpolation space each point is located, for all points which are to be an object for the interpolating operation in an interpolation space;

storing each divided segment thus judged in a storage means with correspondence to respective ones of said points;

detecting a divided segment corresponding to an objective point for the interpolating operation with reference to said storage means, upon performing the interpolating operation; and deriving an interpolation value of the objective point for interpolation by a predetermined arithmetic expression set corresponding to the detected divided segment, wherein a number of data provided for the interpolating operation is variable and the divided segment is classified according to the number of data provided for the interpolating operation for the objective point located in the divided segment.

2. A method as claimed in claim 1, wherein said interpolation space is defined by an interpolation grid determined by data to be object for an interpolating operation, and said divided segment being one of a grid point defined in said interpolation grid, a line defined by two grid points, a plane defined by three of said grid points, and a solid body defined by four or more grid points.

3. A method as claimed in claim 2, wherein the divided segment has the predetermined arithmetic expression in which a number of times of making reference for obtaining grid pint data which is the data provided for the interpolating operation and a number of times of addition, subtraction, multiplication and divisions become smaller in an order of the solid body, the plane, the line and the grid point.

4. A method as claimed in claim 1, wherein, in said step of deriving said interpolation value, making data reference to and addition, subtraction, multiplication and division are performed at minimum times corresponding to the relevant divided segment, in the arithmetic expression set corresponding to said divided segment.

5. A data transformation apparatus for transforming one data space into another data space, comprising:

a look-up table storing transformation data composing the another data space, corresponding to grid points defined in the one data space;

a divided segment calculating means for determining which divided segment of an interpolation space defined by a plurality of the grid points objective point for an interpolating operation using transformation data of the grid points;

a storage means for storing each divided segment determined by said divided segment calculating means with correspondence to each of the respective points;

a divided segment detecting means for detecting a divided segment corresponding to an objective point for an interpolation defined by data to be transformed upon performing data transformation for the data in the one data space with reference to said storage means; and an interpolation operating means for performing an interpolating operation utilizing the transformation data stored in said look-up table on a basis of an arithmetic expression determined corresponding to the divided segment determined by said divided segment determining means and deriving a transformed data relating to the data to be transformed, wherein a number of data provided for the interpolating operation is variable and the divided segment is classified according to the number of the transformation data for the objective point located in the divided segment.

6. A data transformation apparatus as claimed in claim 5, wherein said interpolation space is defined by an interpolation grid determined by data to be object for an interpolating operation, and said divided segment being one of a grid point defined in said interpolation grid, a line defined by two grid points, a plane defined by three of said grid points, and a solid body defined by four or more grid points.

7. A data transformation apparatus as claimed in claim 6, wherein the divided segment has the predetermined arithmetic expression in which a number of times of making reference for obtaining grid point data which is the transformation data and a number of times of addition, subtraction, multiplication and division, become smaller in an order of the solid body, the plane, the line and the grid point.

8. A data transformation apparatus as claimed in claim 5, wherein, in said step of deriving said interpolation value, making data reference to and addition, subtraction, multiplication and division are performed at minimum times corresponding to the relevant divided segment, in the arithmetic expression set corresponding to said divided segment.

9. A data transformation apparatus as claimed in claim 8, wherein said one data space is a space defined by luminance signals of red, green and blue, and the other data space is a space defined by printing signals of at least yellow, magenta and cyan.

10. A data transformation system for transforming one data space into another data space, comprising:

a look-up table storing transformation data composing the another data space, corresponding to grid points defined in the one data space;

a divided segment calculating means for determining in which divided segment of an interpolation space defined by a plurality of the grid points in said one data space each point is located,for all points to be an objective point for an interpolating operation using transformation data of the grid points;

a storage means for storing each divided segment determined by said divided segment calculating means with correspondence to each of the respective points;

a divided segment detecting means for detecting a divided segment corresponding to an objective point for interpolation defined by data to be transformed upon performing data transformation for the data in the one data space with reference to said storage means; and an interpolation operating means for performing an interpolating operation utilizing the transformation data stored in said look-up table on a basis of an arithmetic expression determined corresponding to the divided segment determined by said divided segment determining means and deriving a transformed data relating to the data to be transformed, wherein a number of data provided for the interpolating operation is variable and the divided segment is classified according to the number of the transformation data for the objective point located in the divided segment.

11. A data transformation system as claimed in claim 10, wherein the divided segments determined by said divided segment calculation means are stored in an external storage device, and said storage means stores the divided segments read from said external storage device.

12. A data transformation system as claimed in claim 10, wherein respective processes of said divided segment calculation means, said divided segment detecting means and said an interpolating operation means are executed by a computer on a basis of a programs associated with respective processes stored in an external storage device.

13. A printing system for performing printing on a basis of data derived by transformation of one data space into another data space, comprising:

a look-up table storing transformation data composing the another data space, corresponding to grid points defined in the one data space;

a divided segment calculating means for determining in which divided segment of an interpolation space defined by a plurality of the grid points is located, for all points to be an objective point for an interpolating operation using transformation data of the grid points;

a storage means for storing each divided segment determined by said divided segment calculating means whit correspondence to each of the respective points;

a divided segment detecting means for detecting a divided segment corresponding to an objective point for an interpolation defined by data to be transformed upon performing data transformation for the data in the one data space with reference to said storage means; and an interpolation operating means for performing an interpolating operation utilizing the transformation data stored in said look-up table on a basis of an arithmetic expression determined corresponding to the divided segment determined by said divided segment determining means and deriving a transformed data relating to the data to be transformed, wherein a number of data provided for the interpolating operation is variable and the divided segment is classified according to the number of the transformation data for the objective point located in said divided segment.

14. A printing system as claimed in claim 13, wherein said one data space is a space defined by luminance signals of red, green and blue, and the other data space is a space defined by printing signals of at least yellow, magenta and cyan.

15. A printing system as claimed in claim 14, wherein the divided segments determined by said divided segment calculation means are stored in an external storage device, and said storage means stores the divided segments read from said external storage device.

16. A printing system as claimed in claim 14, wherein respective processes of said divided segment calculation means, said divided segment detecting means and said an interpolating operation means are executed by a computer on a basis of a programs associated with respective processes stored in an external storage device.

17. A storage medium storing a program readable by a computer, wherein said program includes the steps of:

making a judgment as to which divided segment of an interpolations space each point is located, for all points to be an object for an interpolating operation in an interpolation space;

storing each said divided segment thus judged in a storage means with correspondence to each of the respective points;

detecting a divided segment corresponding to an objective point for an interpolating operation with reference to said storage means, upon performing the interpolating operation; and deriving an interpolation value of the objective point for interpolation by a predetermined arithmetic expression set corresponding to the detected segment, wherein a number of data provided for the interpolating operation is variable and the divided segment is classified according to the number of data provided for the interpolating operation for the objective point located in the divided segment.

18. A storage medium as claimed in claim 17, which is removably used with respect to said computer.

19. A storage medium as claimed in claim 18, which is a CD-ROM or floppy disk.

20. A data forming method comprising the steps of:

making a judgment as to which divided segment of an interpolation space each point is located, for all pints to be an object for an interpolating operation in an interpolation space; and storing each of the divided segments thus judged in a storage means with correspondence to each of the respective points, wherein a number of data provided for the interpolating operation is variable and the divided segment is classified according to the number of data provided for the interpolating operation for the objective point located in said divided segment.

21. A method of performing an interpolating operation by using a multi-dimensional table in which a plurality of grid point data are stored said method comprising the steps of:

making a judgment as to where input data is located in a space defined by the plurality of grid point data;

reading N grid point data from the multi-dimensional table in accordance with a result of judgment made in said step of making a judgment; and performing the interpolating operation with use of an arithmetic expression, based on said N grid point data read in said step of reading, wherein N varies according to the judgment result.

22. A method as claimed in claim 21, wherein said step of making a judgment makes a judgment as to whether the input data is located on a side of the space.

23. A method as claimed in claim 21, wherein said step of making a judgment makes a judgment as to whether the input data is located on a plane of the space.

24. A method as claimed in claim 21, which is applied to a color transformation.

25. A method of performing an interpolating operation by using a multi-dimensional table in which a plurality of grid point data are stored, said method comprising the steps of:

selecting an interpolation space based on upper bit data of input data;

making a judgment as to where the input data is located in the interpolation space, based on lower bit data of the input data;

reading N grid point data from M (M≧N) grid point data which are in said interpolation space and are stored in the multi-dimensional table, in accordance with a judgment result made in said step of making a judgment; and performing the interpolating operation based on N grid point data read in said step of reading and the lower bit data of the input data, wherein N varies according to the judgement result.

26. A method a claimed in claim 25, wherein said step of making a judgment makes a judgment as to whether the input data is located on a side of the space.

27. A method as claimed in claim 25, wherein said step of making a judgment makes a judgment as to whether the input data is located on a plane of the space.

28. A method as claimed in claim 27, which is applied to a color transformation.

29. A method as claimed in claim 25, which is applied to a color transformation.

30. A method of performing an interpolating operation by using a multi-dimensional table in which a plurality of grid point data are stored, said method comprising the steps of:

providing a plurality of arithmetic expressions which are classified by a number of terms in an arithmetic expression, the number of terms in the arithmetic expression being variable;

making a judgment as to where input data is located in a space defined by the plurality of grid point data;

selecting an arithmetic expression from the plurality of arithmetic expressions provided by said step of providing, in accordance with a judgment result in said step of making a judgment; and performing the interpolating operation with use of grid point data according to the input data and the arithmetic expression selected by said step of selecting.

31. A method as claimed in claim 30, wherein said step of making a judgment makes a judgment as to whether the input data is located on a side of the space.

32. A method as claimed in claim 30, wherein said step of making a judgment makes a judgment as to whether the input data is located on a plane of the space.

* * * * *

UNITED STATES PATENT AND TRADEMARK OFFICE
CERTIFICATE OF CORRECTION

PATENT NO. : 5,883,821
DATED : MARCH 16, 1999
INVENTOR(S) : TAKESHI KOMAKI

It is certified that error appears in the above-identified patent and that said Letters Patent is hereby corrected as shown below:

ON THE TITLE PAGE

[57] Abstract "deed" should read --depending--.

COLUMN 1 line 12, ""LUT)" should read --"LUT")--.

COLUMN 4 line 4, "the" should be deleted; and
   line 13, "the" should be deleted.

Figure 8:
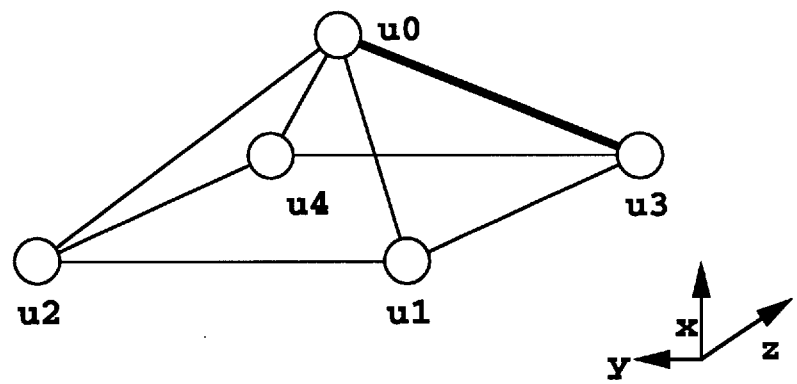
FIG. 8 an illustration for explaining a position condition and an interpolating arithmetic expression in an interpolating solid space of a calculation divided segment 4 denoted by one embodiment of an interpolating arithmetic operation according to the invention.
Figure 9:
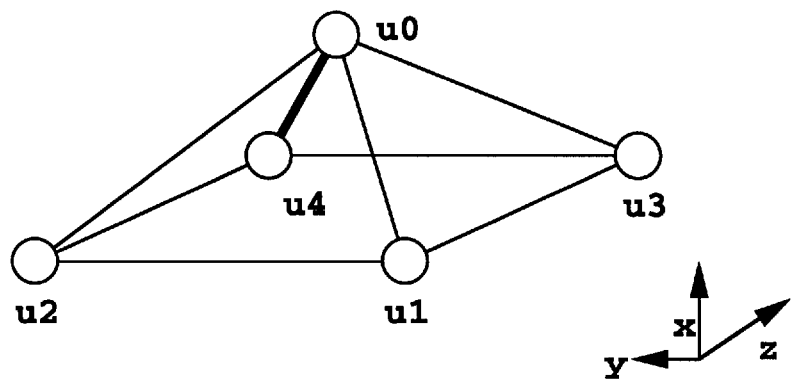
FIG. 9 is an illustration for explaining a position condition and an interpolating arithmetic expression in an interpolating solid space of a calculation divided segment 5 denoted by one embodiment of an interpolating arithmetic operation according to the invention.
Figure 10:
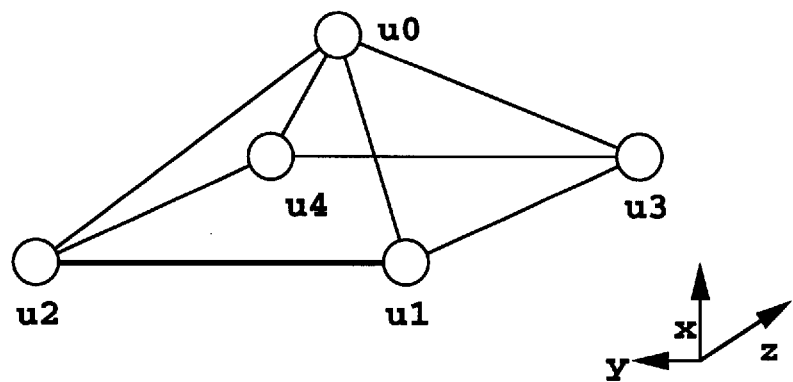
FIG. 10 is an illustration for explaining a position condition and an interpolating arithmetic expression in an interpolating solid space of a calculation divided segment 6 denoted by one embodiment of an interpolating arithmetic operation according to the invention.
Figure 11:
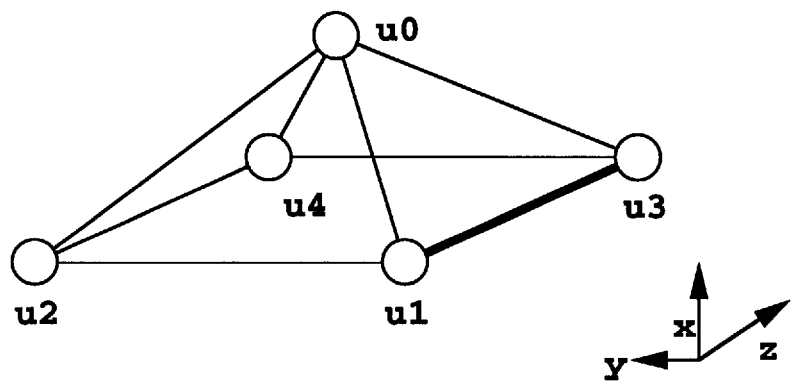
FIG. 11 is an illustration for explaining a position condition and an interpolating arithmetic expression in an interpolating solid space of a calculation divided segment 7 denoted by one embodiment of an interpolating arithmetic operation according to the invention.
Figure 12:
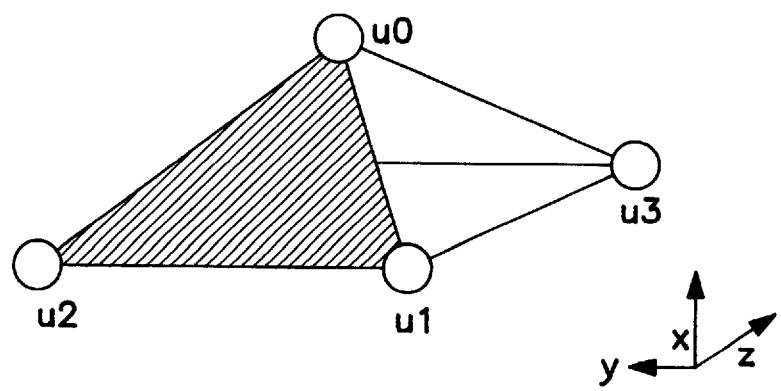
FIG. 12 is an illustration for explaining a position condition and an interpolating arithmetic expression in an interpolating solid space of a calculation divided segment 8 denoted by one embodiment of an interpolating arithmetic operation according to the invention.
Figure 13:
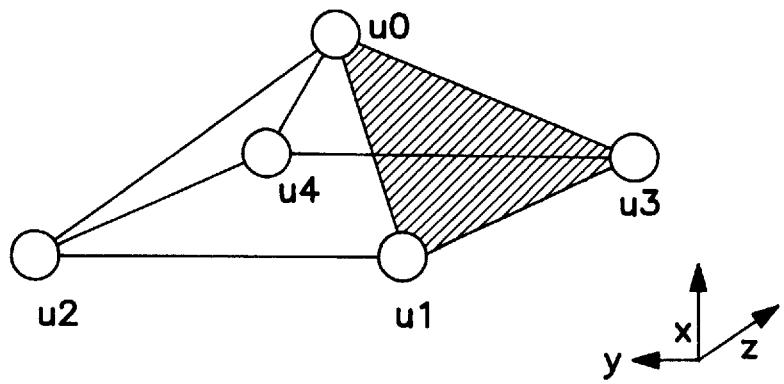
FIG. 13 is an illustration for explaining a position condition and an interpolating arithmetic expression in an interpolating solid space of a calculation divided segment 9 denoted by one embodiment of an interpolating arithmetic operation according to the invention.
Figure 14:
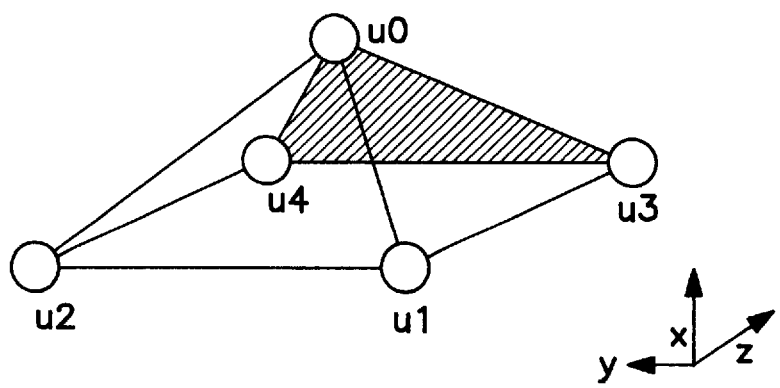
FIG. 14 is an illustration for explaining a position condition and an interpolating arithmetic expression in an interpolating solid space of a calculation divided segment 10 denoted by one embodiment of an interpolating arithmetic operation according to the invention
Figure 15:
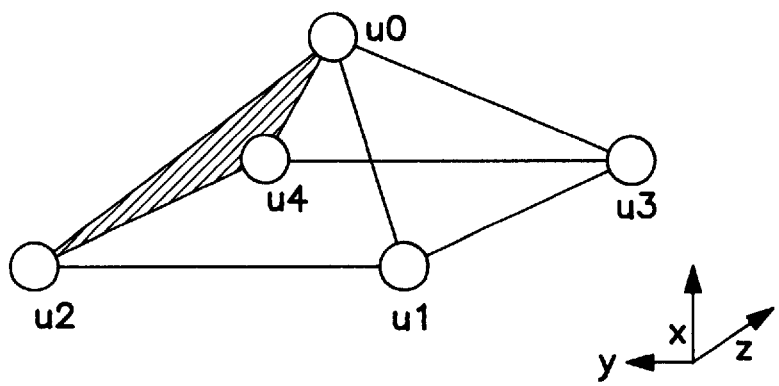
FIG. 15 is an illustration for explaining a position condition and an interpolating arithmetic expression in an interpolating solid space of a calculation divided segment 11 denoted by one embodiment of an interpolating arithmetic operation according to the invention.

COLUMN 5 line 28, "consisted" should read --consisting--;
   line 31, "t" should read --to--; and
   line 54, "FIG.8" should read --FIG. 8 is--.

COLUMN 6 line 22, "invention" should read --invention;--

UNITED STATES PATENT AND TRADEMARK OFFICE
CERTIFICATE OF CORRECTION

PATENT NO. : 5,883,821

DATED : MARCH 16, 1999

INVENTOR(S) : TAKESHI KOMAKI

It is certified that error appears in the above-identified patent and that said Letters Patent is hereby corrected as shown below:

COLUMN 8 line 33, "consisted" should read --consisting--; and
   line 42, "an" should be deleted.

COLUMN 9 line 28 "a a" should read --a--;
   line 37, "is" should ared --are--;
   line 63, "a" should be deleted; and
   line 65, "an" should be deleted.

COLUMN 10 line 9, "an" should be deleted;
   line 16, "an" should be deleted;
   line 17, "an" should be deleted;
   line 24, "an" should be deleted;
   line 26, "an" should be deleted;
   line 31, "an" should be deleted;
   line 37, "an" should be deleted;
   line 38, "a" should be deleted;

UNITED STATES PATENT AND TRADEMARK OFFICE
CERTIFICATE OF CORRECTION

PATENT NO. : 5,883,821

DATED : MARCH 16, 1999

INVENTOR(S) : TAKESHI KOMAKI

It is certified that error appears in the above-identified patent and that said Letters Patent is hereby corrected as shown below:

<u>COLUMN 10</u> continued line 49, "an" should be deleted;
   line 50, "a" should be deleted; and
   line 52, "is" should be deleted.

<u>COLUMN 11</u> line 10, "planes" should read --plane--; and
          "an" should be deleted; and
   line 12, "plane" should read --planes--.

<u>COLUMN 12</u> line 14, "an" should be deleted; and
   line 15, "a" should be deleted.

<u>COLUMN 13</u> line 1, "an" should be deleted;
   line 13, "an" should be deleted;

UNITED STATES PATENT AND TRADEMARK OFFICE
CERTIFICATE OF CORRECTION

PATENT NO. : 5,883,821
DATED      : MARCH 16, 1999
INVENTOR(S): TAKESHI KOMAKI

It is certified that error appears in the above-identified patent and that said Letters Patent is hereby corrected as shown below:

COLUMN 13 continued line 32, "dz)of" should read --dz) of--;
  line 48, "increase" should read --increases--; and
  line 67, "an" should be deleted.

COLUMN 14 line 4, "is" should read --are--;
  line 14, "S5." should read --S5,--;
  line 37, "an" should be deleted;
  line 39, "an" should be deleted; and
  line 40, "tends" should be deleted and "point" should
      read --points--.

COLUMN 16 line 1, "to" should read --for--;
  line 18, "embodies" should read --embodied--;
  line 22, "operations" should read --operation--;
  line 52, "pint" should read --point--; and
  line 55, "divisions" should read --division,--.

UNITED STATES PATENT AND TRADEMARK OFFICE
CERTIFICATE OF CORRECTION

PATENT NO. : 5,883,821

DATED : MARCH 16, 1999

INVENTOR(S) : TAKESHI KOMAKI

It is certified that error appears in the above-identified patent and that said Letters Patent is hereby corrected as shown below:

COLUMN 18

```
line 23, "an" should be deleted;
line 24, "programs" should read --program--; and
line 38, "whit" should read --with--.
```

COLUMN 19

```
line 3,  "an" should be deleted;
line 5,  "programs" should read --program--;
line 10, "interpolatioins" should read --interpolation--;
line 35, "pints" should read --points--;
line 49  "stored" should read --stored,--; and
line 57, "reading," should read --reading, ¶--.
```

UNITED STATES PATENT AND TRADEMARK OFFICE
CERTIFICATE OF CORRECTION

PATENT NO. : 5,883,821

DATED : MARCH 16, 1999

INVENTOR(S) : TAKESHI KOMAKI

It is certified that error appears in the above-identified patent and that said Letters Patent is hereby corrected as shown below:

COLUMN 20 line 25, "method a" should read --method as--.

Signed and Sealed this

Twenty-first Day of December, 1999

Attest:

Q. TODD DICKINSON

Attesting Officer

Acting Commissioner of Patents and Trademarks